United States Patent
Ohashi et al.

[11] Patent Number: 5,913,241
[45] Date of Patent: Jun. 15, 1999

[54] APPARATUS FOR ESTIMATING VEHICLE TIRE AIR PRESSURE FROM NOT ONLY TIRED WHEEL MOTION BUT ALSO TIRE TEMPERATURE

[75] Inventors: Hideki Ohashi; Hiroyuki Kawai, both of Susono; Hiroyoshi Kojima, Nishio; Takeyasu Taguchi, Obu; Kenji Fujiwara, Kariya; Takaji Umeno, Aichi-ken, all of Japan

[73] Assignee: Toyota Jidosha Kabushiki Kaisha, Toyota, Japan

[21] Appl. No.: 08/861,737

[22] Filed: May 22, 1997

[30] Foreign Application Priority Data

May 23, 1996 [JP] Japan ................................... 8-128330

[51] Int. Cl.⁶ .............................. B60C 23/02; E01C 23/00
[52] U.S. Cl. ............................................. 73/146.2; 73/146
[58] Field of Search .................................... 73/146, 146.2, 73/146.5, 146.8; 340/443, 448, 449

[56] References Cited

U.S. PATENT DOCUMENTS

| | | | |
|---|---|---|---|
| 4,574,267 | 3/1986 | Jones | 73/146.2 X |
| 4,695,823 | 9/1987 | Vernon | 73/146.2 X |
| 5,050,110 | 9/1991 | Rott. | |
| 5,228,337 | 7/1993 | Sharpe et al. | 73/146.5 |
| 5,231,872 | 8/1993 | Bowler et al. | 73/146.5 |
| 5,353,020 | 10/1994 | Schurmann | 340/448 X |
| 5,497,657 | 3/1996 | Taguchi et al. | 73/146.2 |
| 5,531,110 | 7/1996 | Ohashi et al. | 73/146 |
| 5,540,092 | 7/1996 | Handfield et al. | 73/146.5 |
| 5,553,491 | 9/1996 | Naito et al. | 73/146.5 |
| 5,569,848 | 10/1996 | Sharp | 73/146.2 |

FOREIGN PATENT DOCUMENTS

C1-37 41 818  5/1989  Germany.
A-5-133831   5/1993  Japan.

OTHER PUBLICATIONS

Patent Abstract of Japan, vol. 095, No. 001, Feb. 28, 1995 (JP–A–06 278 422).

*Primary Examiner*—Harshad Patel
*Assistant Examiner*—Robin C. Clark
*Attorney, Agent, or Firm*—Oliff & Berridge, PLC

[57] ABSTRACT

An apparatus for estimating an air pressure of a tire of a tired wheel of a motor vehicle, on the basis of a temperature of the tire as well as a motion of the tired wheel, preferably including a temperature-related variable sensor for detecting a temperature-related variable related to the temperature of the tire, and an estimating device for estimating the air pressure of the tire on the basis of the temperature-related variable as well as the motion of the tired wheel.

8 Claims, 17 Drawing Sheets

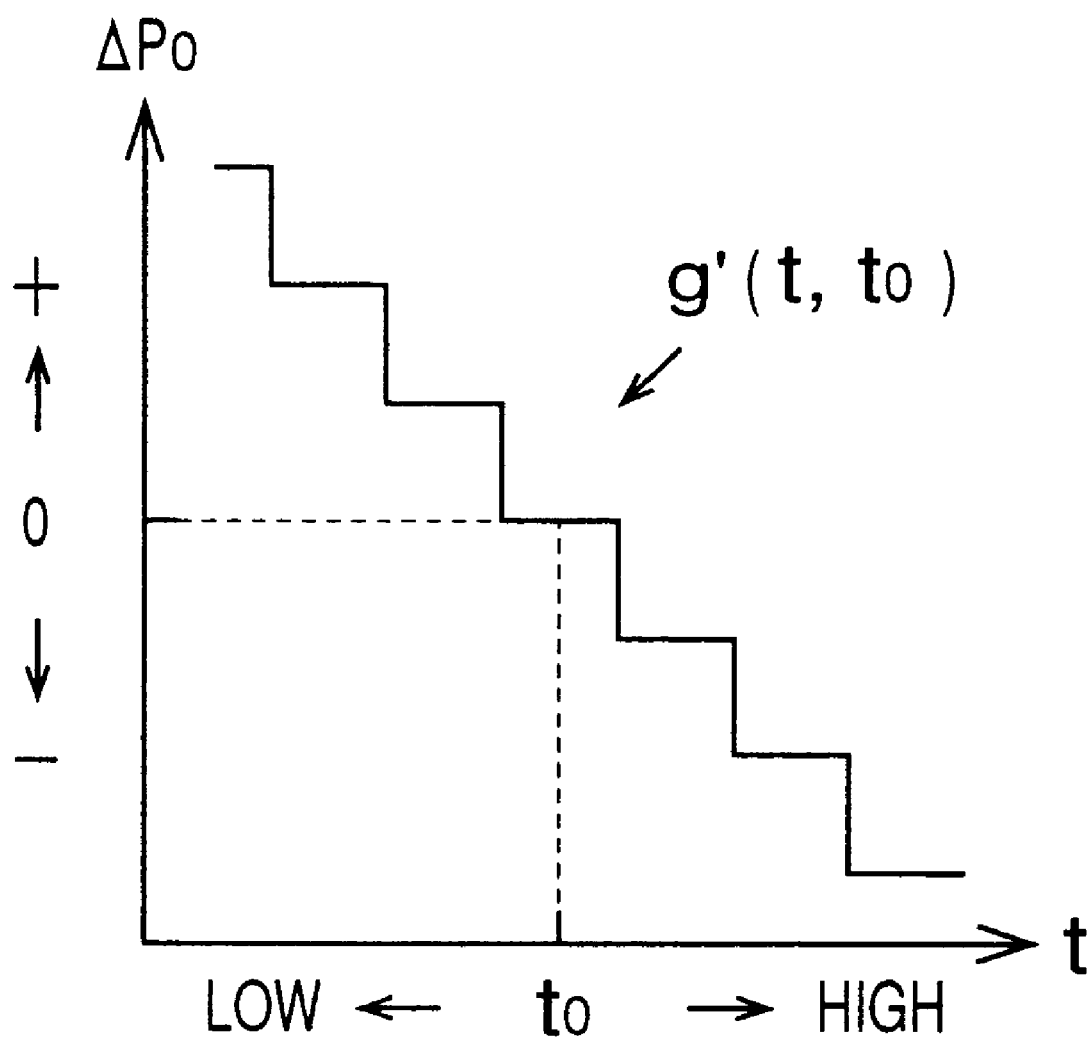

APPARATUS FOR ESTIMATING VEHICLE TIRE AIR PRESSURE FROM NOT ONLY TIRED WHEEL MOTION BUT ALSO TIRE TEMPERATURE

This application is based on Japanese Patent Application No. 8-128330 filed May 23, 1996, the content of which is incorporated hereinto by reference.

BACKGROUND OF THE INVENTION

1. Field of the Invention

The present invention relates in general to techniques for estimating or indirectly detecting an air pressure condition of a tire of a wheel of a motor vehicle, on the basis of a motion of the vehicle wheel, and more particularly to techniques for improving the accuracy of detection or estimation of the air pressure condition of the vehicle tire.

2. Discussion of the Related Art

There is known a technique for directly detecting the air pressure in a space within a tire of a vehicle wheel, for informing the operator or driver of a motor vehicle of the air pressure of the tire during running of the vehicle. Since the tire is rotating during the vehicle running, it is comparatively difficult to directly detect the air pressure of the tire. In view of this difficulty, a technique has been proposed for estimating the air pressure of the tire on the basis of the motion of the vehicle wheel, as disclosed in JP-A-5-133831 and U.S. Pat. No. 5,531,110.

The technique for estimating the air pressure of the tire is based on a fact that the air pressure of the tire has a given relationship with the rigidity of the tire. The rigidity of the tire has not only a component relying on the air pressure in a space within the tire, but also a component relying on the hardness of a rubber material of the tire. These two components of the tire rigidity cannot be estimated independently of each other. It is also noted that the rubber hardness of the tire varies with the temperature of the rubber material.

However, the known technique for estimating or indirectly detecting the air pressure of the tire is not adapted to take into account a change in the tire temperature, in estimating the air pressure of the tire. In this case, the estimated air pressure of the tire differs from the actual pressure value due to a change of the rubber hardness caused by a change of the tire temperature, even if the tire air pressure estimated at a given temperature of the tire accurately represents the actual value.

The above technique for estimating the tire air pressure may be used to inform the vehicle operator that the air pressure is abnormally low. In this case, abnormally low air pressure of the tire may be estimated when the rubber hardness of the tire is excessively lowered due to a rise of the tire temperature, even if the actual air pressure of the tire is normal, that is, even where the vehicle operator should not be warned of the abnormality of the tire air pressure. Conversely, the abnormally low air pressure of the tire may not be estimated when the rubber hardness is excessively increased due to a drop of the tire temperature, even if the actual air pressure is abnormally low, that is, even where the vehicle operator should be warned of the abnormality of the tire air pressure.

SUMMARY OF THE INVENTION

It is therefore an object of the present invention to provide a tire air pressure estimating apparatus for a motor vehicle, which at least substantially ameliorates the problem of the prior art described above, by taking the tire temperature into account in estimating the air pressure.

The above object may be achieved according to the principle of this invention, which provides an apparatus for estimating an air pressure of a tire of a tired wheel of a motor vehicle, on the basis of a motion of the tired wheel, wherein the air pressure of the tire is estimated on the basis of a temperature of the tire as well as the motion of the tired wheel.

In the tire air pressure estimating apparatus of the present invention described above, the air pressure of the tire is estimated on the basis of not only the motion of the tired wheel but also the temperature of the tire, so that the air pressure of the tire is compensated for a change in the tire temperature. Accordingly, the accuracy of estimation of the tire air pressure by the present apparatus is improved over that of the prior art apparatus.

The "motion of the tired wheel" may be represented by a physical value indicative of a rotary motion of the tired wheel, such as an angular velocity, an angular acceleration, a peripheral speed, a peripheral acceleration, or the frequency of such a rotary motion value, or alternatively by a physical value indicative of a vertical linear motion of the tired wheel, such as a vertical acceleration or the frequency of the vertical acceleration.

The estimation of "an air pressure of the tire" includes absolute estimation of the value of the air pressure, static estimation as to whether the air pressure is lower or higher than a threshold or critical value, or dynamic estimation as to whether the rate or amount of change of the air pressure is lower or higher, or smaller or larger than a threshold or critical value. Accordingly, the output of the present apparatus may indicate the estimated value of the air pressure, or may take the form of an indication that the air pressure is abnormally low or high, an indication that the rate of reduction of the air pressure is abnormally high, an indication that the rate of increase of the air pressure is abnormally high, or an indication that the amount of change of the air pressure is abnormally large.

In a first preferred form of the present invention, the apparatus comprises: a wheel motion sensor for detecting the motion of the tired wheel; a temperature-related variable sensor for detecting a temperature-related variable related to the temperature of the tire; and estimating means for estimating the air pressure of the tire on the basis of the temperature-related variable as well as the motion of the tired wheel.

In the above first preferred form of the invention, the accuracy of estimation of the air pressure of the tire is improved owing to the estimation on the basis of not only the motion of the tired wheel but also the temperature-related variable related to the temperature of the tire.

The temperature-related variable may be the temperature of the tire per se, a temperature such as the ambient temperature, which influences the hardness or rigidity of the rubber material of the tire, or a non-temperature physical value which influences the hardness or rigidity of the rubber material of the tire. The non-temperature physical value may be a running distance of the vehicle after the ignition key switch is turned on. Generally, the temperature of the tire increases with an increase in the running distance of the vehicle. In other words, there is a certain relationship between the running distance of the vehicle and the temperature of the tire.

As described above, the output of the present preferred form of the apparatus may take the form of an indication of the estimated value of the air pressure per se, or an indication of a static or dynamic state of the air pressure.

In one advantageous arrangement of the above first preferred form of the invention, the estimating means includes: provisional value calculating means for calculating a provisional value of the air pressure of the tire, on the basis of the motion of the tired wheel detected by the wheel motion sensor, such that the provisional value represents an actual value of the air pressure when the temperature-related variable detected by the temperature-related variable sensor is equal to a reference value; and provisional value compensating means for compensating the provisional value calculated by the provisional value calculating means, on the basis of the temperature-related variable and according to a predetermined relationship between the temperature-related variable and a final value of the air pressure which is the provisional value compensated by the provisional value compensating means.

The air pressure of the tire may be estimated on the basis of the detected motion of the tired wheel and the detected temperature-related variable. If this arrangement is obtained by modifying an existing apparatus which is adapted to estimate the air pressure of the tire on the basis of the detected motion of the tired wheel, without the temperature of the tire taken into account, the estimating means of the existing apparatus should be totally re-designed. On the other hand, the above-indicated advantageous arrangement including the provisional value compensating means may be readily obtained by simply adding the provisional value compensating means to the provisional value calculating means which corresponds to the estimating means of the existing apparatus. Therefore, the present arrangement is available at a relatively low cost.

According to one preferred feature of the above advantageous arrangement including the provisional value calculating means and the provisional value compensating means, the wheel motion sensor comprises a wheel speed sensor for detecting a rotating speed of the tired wheel as the motion of the tired wheel, and the provisional value calculating means comprises a disturbance observer designed according to a dynamic model of the tired wheel in which a rim and a belt are connected to each other rotatably relative to each other by a torsion spring. In this case, the disturbance observer is adapted to estimate, as a disturbance acting on the tire and as a variable indicative of a state of the dynamic model, an amount of deviation of a spring constant of the torsion spring from a nominal value, on the basis of the rotating speed of the tired wheel which is detected by the wheel speed sensor as a rotating speed of the rim, and the provisional value calculating means is adapted to calculate the provisional value of the air pressure of the tire on the basis of the disturbance estimated by the disturbance observer.

Recently, a wheel control apparatus such as an anti-lock brake control apparatus or a traction control apparatus is widely used on motor vehicles, and most of the motor vehicles equipped with such a wheel control apparatus have a wheel speed sensor for detecting the rotating speed of each wheel. Therefore, the preferred feature indicated is available at a relatively low cost without a hardware exclusively used for detecting the wheel speed.

The rotating speed of the tired wheel or rim detected by the wheel speed sensor may be the angular velocity of the wheel or rim, or the peripheral speed of the wheel or rim which is a product of the angular velocity and the radius of the wheel or rim.

The calculation of the provisional value of the air pressure on the basis of the disturbance estimated by the disturbance observer may be made by calculating the actual spring constant of the torsion spring by obtaining a sum of the nominal value of the spring constant and the estimated amount of deviation of the spring constant from the nominal value. The nominal value of the spring constant may be a fixed value, or may be a variable which is obtained or updated by adding the amount of deviation of the spring constant estimated in the last control cycle to the nominal value used in the last control cycle. In the latter case, the updated variable is used as the nominal value in the next control cycle. The nominal value may be changed or updated repeatedly until the estimated amount of deviation of the spring constant is substantially zeroed. In this case, the nominal value when the estimated amount of deviation is substantially zeroed is used as the actual value of the spring constant of the torsion spring.

According to another preferred feature of the above advantageous arrangement including the provisional value calculating means and the provisional value compensating means, the provisional value calculating means calculates the provisional value of the air pressure of the tire on the basis of a frequency of at least one of a plurality of frequency components of the motion of the tired wheel within a predetermined frequency range, the above-indicated at least one of the plurality of frequency components having a substantially largest intensity.

In the present apparatus, too, the "motion of the tired wheel" may be represented by a physical value indicative of a rotary motion of the tired wheel, such as the angular velocity or acceleration, a peripheral speed or acceleration, or the frequency of such a rotary motion value, or alternatively by a physical value indicative of a vertical linear motion of the tired wheel, such as a vertical acceleration or the frequency of the vertical acceleration. In the present apparatus, the wheel motion sensor may be a sensor for detecting the speed of the tired wheel, a sensor for detecting the acceleration of an upsprung member of the motor vehicle, a sensor for detecting the height of the motor vehicle, or a sensor for detecting a load acting on the motor vehicle.

According to a further preferred feature of the above advantageous arrangement including the provisional value calculating means and the provisional value compensating means, the provisional value compensating means determines a compensating coefficient on the basis of the temperature-related variable detected by the temperature-related variable sensor, and according to a predetermined relationship between the compensating coefficient and the temperature-related variable, and the provisional value compensating means calculates the final value of the air pressure of the tire by multiplying the provisional value by the compensating coefficient.

The predetermined relationship between the compensating coefficient and the temperature-related variable may be formulated such that the compensating coefficient is larger when the temperature-related variable indicates a relatively high temperature of the tire, than when the temperature-related variable indicates a relatively low temperature of the tire. In this case, the air pressure is compensated for a decrease in the hardness of the rubber material of the tire due to an increase in the temperature of the tire.

Alternatively, the provisional value compensating means may be adapted to determine a compensating amount on the basis of the temperature-related variable detected by the temperature-related variable sensor, and according to a predetermined relationship between the compensating amount and the temperature-related variable. In this case, the provisional value compensating means is adapted to calculate the final value of the air pressure of the tire by adding the compensating amount to the provisional value. In this instance, the predetermined relationship between the compensating amount and the temperature-related variable may be formulated such that the compensating amount is larger when the temperature-related variable indicates a relatively high temperature of the tire, than when the temperature-related variable indicates a relatively low temperature of the tire. In this case, too, the air pressure is compensated for a decrease in the hardness of the rubber material of the tire due to an increase in the temperature of the tire.

In a second preferred form of the present invention, the apparatus comprises: a wheel motion sensor for detecting the motion of the tired wheel; a temperature-related variable sensor for detecting a temperature-related variable related to the temperature of the tire; estimating means for estimating the air pressure of the tire on the basis of the motion of the tired wheel detected by the wheel motion sensor; determining means for determining whether the air pressure estimated by the estimating means is abnormal, on the basis of the estimated air pressure as compared with a predetermined threshold; and compensating means for compensating the predetermined threshold on the basis of the temperature-related variable detected by the temperature-related variable sensor.

In this second preferred form of the invention, the compensation based on the temperature-related variable is not made with respect to the estimated air pressure of the tire, but is made with respect to the threshold which is compared with the estimated air pressure by the determining means for determination as to whether the air pressure is abnormal or not. Thus, the compensation for a change in the temperature of the tire is made upon determination as to whether the air pressure is abnormal.

The determination as to whether the air pressure is abnormal may be a determination as to whether the air pressure is lower or higher than the threshold.

In a third preferred form of the invention, the temperature-related variable detected by the temperature-related variable sensor is an ambient temperature of the motor vehicle.

Although the temperature of the tire per se is desirably detected as the temperature which influences the hardness of the rubber material of the tire, the detection of the tire temperature is comparatively difficult. On the other hand, the detection of the ambient temperature of the vehicle is comparatively easy, and there exists a predetermined relationship between the ambient temperature and the temperature of the tire. Namely, the temperature of the tire increases with an increase in the ambient temperature of the vehicle. In view of this fact, the ambient temperature is used in place of the temperature of the tire in the above third preferred form of the invention. In this respect, it is noted that some of recent motor vehicles are equipped with an ambient temperature sensor for detecting the ambient temperature for controlling an air conditioner for automatic air conditioning in the driver's and passengers' compartments of the vehicle, or for informing the vehicle driver or operator of a frozen state of the road surface, for example. Where the present tire air pressure estimating apparatus is used on a motor vehicle having an ambient temperature sensor for automatic air conditioning or providing road surface information or for other purposes, the tire air pressure estimating apparatus may utilize the ambient temperature sensor to detect the ambient temperature as the temperature-related variable and is accordingly available at a relatively low cost.

BRIEF DESCRIPTION OF THE DRAWINGS

The above and optional objects, features, advantages and technical and industrial significance of this invention will be better understood by reading the following detailed description of presently preferred embodiments of the invention, when considered in connection with the accompanying drawings, in which:

FIG. 18 is a graph for explaining the details of compensation of air pressure value in the apparatus of FIG. 17.

DETAILED DESCRIPTION OF THE PREFERRED EMBODIMENTS

Figure 1:
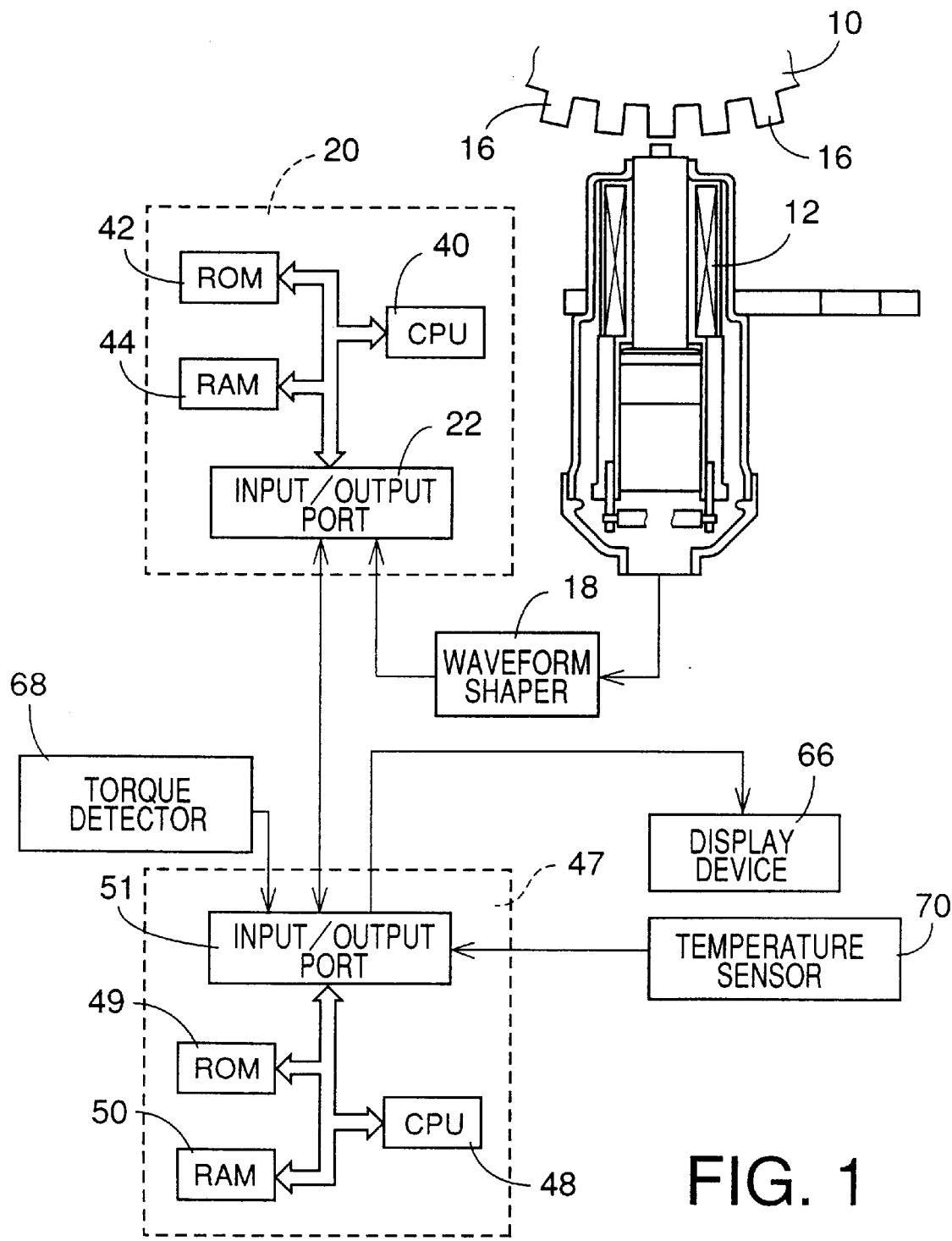
FIG. 1 is a schematic view illustrating one embodiment of a vehicle tire air pressure estimating apparatus of the present invention, in the form of an apparatus for detecting abnormality of the tire air pressure.
Figure 2:
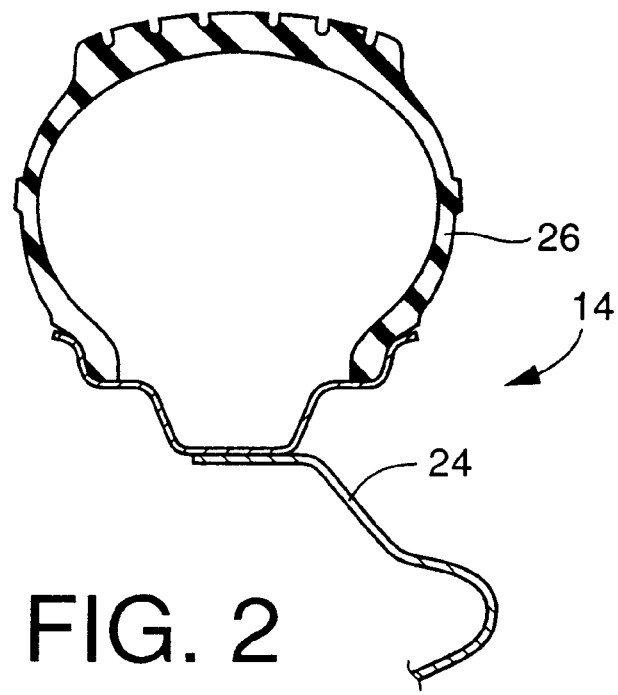
FIG. 2 is a fragmentary cross sectional view of a tired wheel of the vehicle whose tire air pressure is detected by the apparatus of FIG. 1.

Referring first to FIGS. 1 and 2, there will be described a vehicle tire air pressure abnormality detecting apparatus constructed according to the first embodiment of the present embodiment. This apparatus includes a magnetic pickup 12 disposed adjacent to a rotor 10 which rotates with a tired wheel indicated generally at 14 in FIG. 2. The magnetic pickup 12 serves as a wheel speed sensor for detecting the rotating speed of the wheel 14. The rotor 10 has a multiplicity of teeth 16 formed along its outer periphery such that the teeth 16 are equally spaced apart from each other in the circumferential direction, that is, in the direction of rotation of the rotor 10.

The magnetic pickup or wheel speed sensor 12 is constructed to generate an output signal in the form of a voltage signal whose amplitude periodically changes as the teeth 16 pass the sensing head of the wheel speed sensor 12. The waveform of the voltage signal generated by the wheel speed sensor 12 is shaped into a rectangular pulse form by a waveform shaper 18, and the shaped pulse signal is applied to an input/output port 22 of a computer 20. While only one set of the rotor 10, wheel speed sensor 12 and waveform shaper 18 is shown in FIG. 1, for illustrative purpose only, the motor vehicle has four tired wheels 14, and each of these four tired wheels 14 is provided with the rotor 10, the wheel speed sensor 12 and the waveform shaper 18. Each wheel speed sensor 12 is connected to the computer 20 through the appropriate waveform shaper 18.

Figure 3:
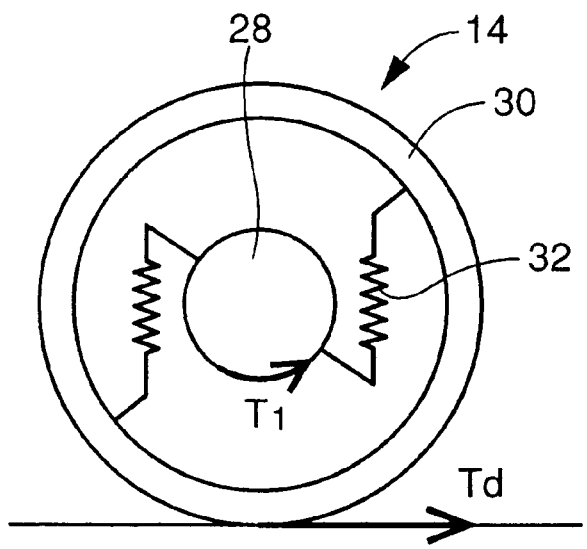
FIG. 3 is a view showing a dynamic model of the tired wheel of FIG. 2.

Each tired wheel 14 consists of a metal wheel member 24, and a tire 26 attached to a rim of the wheel member 24. The tired wheel 14 is dynamically simulated as a system or model as illustrated in FIG. 3, in which an inner rim 28 and an outer belt 30 are connected to each other by an intermediate torsion spring 32 such that the rim 28 and the belt 30 are rotatable relative to each other. The belt 30 is considered to be the outer surface of the tire 26 at which the tired wheel 14 contacts the road surface. Since the rotor 10 is disposed so as to rotate with the metal wheel member 24, the wheel speed sensor 12 in the form of the magnetic pickup is considered, in a strict sense, to be a speed sensor adapted to detect an angular velocity of the rim 28.

Figure 4:
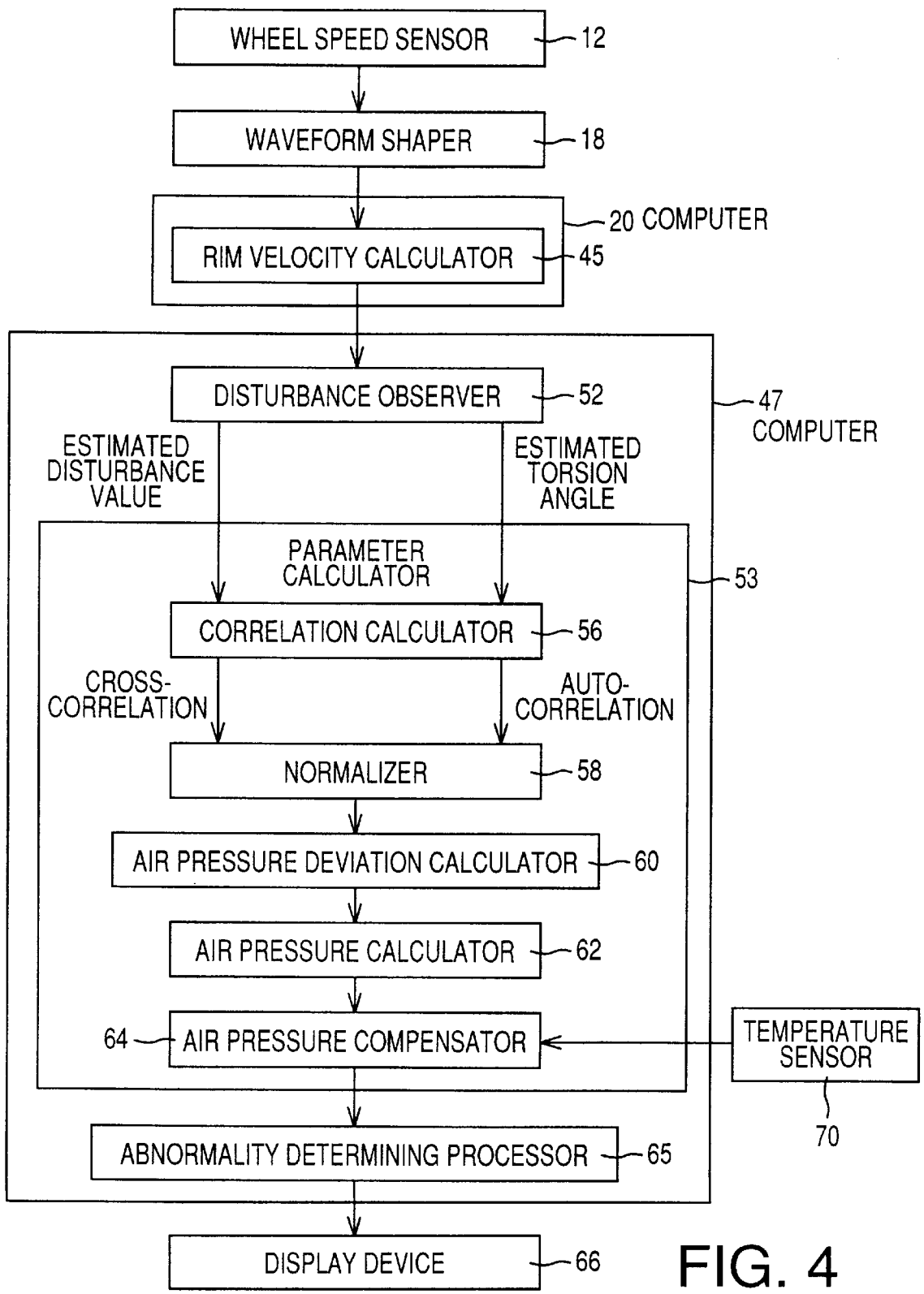
FIG. 4 is a block diagram illustrating the functional elements of the apparatus of FIG. 1.

The computer 20 incorporates a CPU 40 as a central processing unit, and two memories in the form of a read-only memory (ROM) 42 and a random-access memory (RAM) 44, as shown in FIG. 1. The ROM 42 stores a control program for calculating the angular velocity of the rim 28, and cooperates with the CPU 40 and RAM 44 to constitute a rim velocity calculator 45 indicated in the block diagram of FIG. 4.

The computer 20 is connected to another computer 47 as shown in FIG. 1, which incorporates a CPU 49 as a central processing unit, and memories in the form of a read-only memory (ROM) 49 and a random-access memory (RAM) 50, and an input/output port 51 as an input/output device. The ROM 49 stores various control programs such as a program for executing a tire air pressure abnormality detecting routine illustrated in the flow chart of FIG. 5, and cooperates with the CPU 48 and the RAM 50 to constitute a disturbance observer 52, a parameter calculator 53 and an abnormality determining processor 65, as indicated in the block diagram of FIG. 4. The parameter calculator 53 includes a correlation calculator 56, a normalizer 58, an air pressure deviation calculator 60, an air pressure calculator 62, and an air pressure compensator 64.

To the input/output port 51 of the computer 47, there is connected a display device 66 which indicates the content of an output of the abnormality determining processor 65, namely, indicates a result of determination by the abnormality determining processor 65. The indication provided on the display device 66 aids the operator of the vehicle in recognizing the condition of each tired wheel 14. While the display device 66 is a liquid crystal display in the present embodiment, the liquid crystal display device 66 may be replaced by any other suitable indicator or display such as an indicator light device operated in an appropriate manner, for instance, in a flickering manner, or a voice indicator which speaks to the vehicle operator.

Also connected to the input/output port 51 is a torque detector 68 adapted to detect a driving torque or a braking torque of the wheel member 24 (rim 28). For example, the torque detector 68 may include a strain gage fixed to the axle of the wheel member 24.

A temperature sensor 70 is also connected to the input/output port 51. The temperature sensor 70 is located at a front portion of the motor vehicle (e.g., adjacent to a front bumper), and includes a thermistor whose resistance varies with an ambient temperature t of the vehicle.

There will next be described the disturbance observer 52.

The disturbance observer 52 is arranged according to the dynamic model of the tired wheel 14 as illustrated in FIG. 3. If the tired wheel 14 is simulated as the dynamic model of FIG. 3 wherein the rim 28 and the belt 30 having respective moments of inertia $J_R$ and $J_B$ are connected by the torsion spring 32 having a spring constant K, the following equations of state (1), (2) and (3) are established so as to define a linear dynamic system:

$$J_R \omega_R' = -K\theta_{RB} + T_1 \quad (1)$$

$$J_B \omega_B' = K\theta_{RB} - T_d \quad (2)$$

$$\theta_{RB}' = \omega_R - \omega_B \quad (3)$$

where $\omega_R$: angular velocity of the rim 28, $\omega_R'$: angular acceleration of the rim 28, $\omega_B$: angular velocity of the belt 30, $\omega_B'$: angular acceleration of the belt 30, $\theta_{RB}$: torsion angle between the rim 28 and the belt 30, $T_1$: driving or braking torque detected by the torque detector 68, $T_d$: disturbance torque derived from irregularities of road surface condition Actually, a damper is present between the rim 28 and the belt 30. Since the influence of the damper is relatively small, the presence of the damper is ignored in the above equations in the present embodiment.

The above state equations (1), (2) and (3) may be converted into the following equation (4) using vectors and matrices:

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ -1/J_B \\ 0 \end{bmatrix} T_d \quad (4)$$

The motion of the tired wheel 14 when the spring constant K of the torsion spring 32 is changed from K to K+ΔK due to a change in the air pressure of the tire 26 is expressed by the following equation (5):

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ -1/J_B \\ 0 \end{bmatrix} T_d + \begin{bmatrix} -\Delta K/J_R \\ \Delta K/J_B \\ 0 \end{bmatrix} \theta_{RB} \quad (5)$$

The amount of change $\Delta K$ of the spring constant K is equivalent to the amount of a disturbance acting on the tire 26 in the normal condition, which disturbance is expressed by the last term of the right member of the above equation (5). It will be understood that the last term of the right member of the equation (5) includes the amount of change $\Delta K$, which varies with a change in the air pressure of the tire 26. In other words, the amount of change in the air pressure of the tire 26 can be estimated by estimating the disturbance as expressed by the last term of the right member of the equation (5). The disturbance observer 52 should be adapted to estimate an overall disturbance w which includes the disturbance torque $T_d$ (due to a change of the road surface condition) of the wheel 14, as well as the disturbance due to the change in the air pressure of the 20 tire 26. The overall disturbance w is represented by the following equation (6):

$$[w] = \begin{bmatrix} 0 \\ -1/J_B \\ 0 \end{bmatrix} T_d + \begin{bmatrix} -\Delta K/J_R \\ \Delta K/J_B \\ 0 \end{bmatrix} \theta_{RB} \quad (6)$$

Theoretically, however, only one of the three elements of the disturbance w can be estimated by the observer 52. Therefore, only the second element $w_2$ is estimated according to the following equation (7), and the motion state of the tired wheel 14 is expressed by the following equation of state (8):

$$w_2 = (-1/J_B)T_d + (\Delta K/J_B)\theta_{RB} \quad (7)$$

$$\begin{bmatrix} \omega_R' \\ \omega_B' \\ \theta_{RB}' \end{bmatrix} = \begin{bmatrix} 0 & 0 & -K/J_R \\ 0 & 0 & K/J_B \\ 1 & -1 & 0 \end{bmatrix} \begin{bmatrix} \omega_R \\ \omega_B \\ \theta_{RB} \end{bmatrix} + \begin{bmatrix} 1/J_R \\ 0 \\ 0 \end{bmatrix} T_1 + \begin{bmatrix} 0 \\ 1 \\ 0 \end{bmatrix} w_2 \quad (8)$$

Thus, the disturbance observer 52 operates according to the above equation (8), to estimate the disturbance as one of variables which reflect the state of the system. To use the disturbance $w_2$ of the equation (7) as one of the variables, the following equation (9) is used to approximate the disturbance to be estimated:

$$w_2' = 0 \quad (9)$$

The approximation according to the above equation (9) means approximation (zeroth order approximation) of a continuously varying disturbance by successive values which change in steps. This approximation is substantially acceptable if the disturbance estimating speed of the disturbance observer 52 is high enough to follow the changing rate or velocity of the disturbance to be estimated. The following equation (10) represents an expanded system which includes the disturbance $w_2$ as one of the system variables according to the equation (9):

$$\begin{bmatrix} \omega_R' \\ \omega_B' \\ \theta_{RB}' \\ w_2' \end{bmatrix} = \begin{bmatrix} 0 & 0 & -K/J_R & 0 \\ 0 & 0 & K/J_B & 1 \\ 1 & -1 & 0 & 0 \\ 0 & 0 & 0 & 0 \end{bmatrix} \begin{bmatrix} \omega_R \\ \omega_B \\ \theta_{RB} \\ w_2 \end{bmatrix} + \begin{bmatrix} 1/J_R \\ 0 \\ 0 \\ 0 \end{bmatrix} T_1 \quad (10)$$

In the above equation (10), $[\omega_B \theta_{RB} w_2]^T$ cannot be detected. In the system using the disturbance observer 52, not only the disturbance $w_2$ but also the variables $\omega_B$ and $\theta_{RB}$ that cannot be measured can be estimated.

For simplification, the above equation (10) is broken down into the following vectors and matrices:

| | | | | |
|---|---|---|---|---|
| $[x_a]$ | = | $\omega_R$ | | |
| $[x_b]$ | = | $[\omega_B$ | $\theta_{RB}$ | $w_2]^T$ |
| $[u]$ | = | $T_1$ | | |
| $[A_{11}]$ | = | 0 | | |
| $[A_{12}]$ | = | $[0$ | $-K/J_R$ | $0]$ |
| $[A_{21}]$ | = | $[0$ | $1$ | $0]$ |
| $[A_{22}]$ | = | $\begin{bmatrix} 0 & K/J_B & 1 \\ -1 & 0 & 0 \\ 0 & 0 & 0 \end{bmatrix}$ | | |
| $[B_1]$ | = | $1/J_R$ | | |
| $[B_2]$ | = | $[0$ | $0$ | $0]^T$ |

The minimum-order observer to estimate the state $[z] = [\omega_B \theta_{RB} w_2]^T$ is expressed by the following equation (11):

$$[z_p'] = [A_{21}][x_a] + [A_{22}][z_p] + [B_2][u] + [G]\{[$$

$$x_a'] - ([A_{11}][x_a] + [A_{12}][z_p] + [B_1][u])\} = ([A_{21}] - [G][A_{11}])[x_a] + ([A_{22}] - [G][A_{12}])[z_p] + [G][x_a'] + ([B_2] - [G][B_1])[u] \quad (11)$$

where

[$z_p$]: estimated value of [z],

[$z_p'$]: rate of change of the estimated value [$z_p$],

[G]: gain which determines the estimating speed of the disturbance observer 52

Figure 6:
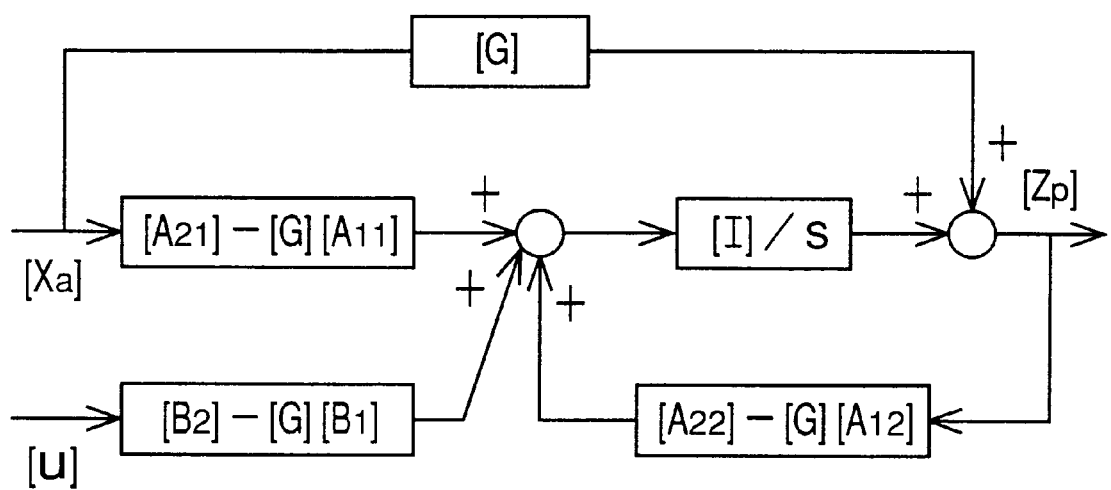
FIG. 6 is a block diagram illustrating a disturbance observer incorporated in the apparatus.

The above equation (11) is expressed by the block diagram of FIG. 6, wherein [I] represents a unit or identity matrix, while "s" represents a Laplace operator.

If an error between the true value [z] and the estimated value [$z_p$] is expressed as [e]=[z]−[$z_p$] and if a rate of change of the error [e] is represented by [e']m the following equation (12) is obtained:

$$[e'] = ([A_{22}] - [G][A_{12}])[e] \quad (12)$$

The above equation (12) indicates the estimating characteristic of the disturbance observer 52, and the eigen values of the matrix ($[A_{22}]-[G][A_{12}]$) are the pole of the disturbance observer 52. Accordingly, the estimating speed of the disturbance observer 52 increases as the eigen values deviate from the origin in the left half of the S-plane. The observer gain [G] is suitably determined depending upon a desired value of the estimating speed of the disturbance observer 52.

The disturbance observer 52 arranged as described above receives as an input the angular velocity $\omega_R$ of the rim 28 which is calculated by the rim velocity calculator 45. On the basis of the angular velocity $\omega_R$, the observer 52 estimates the disturbance $w_2$ as expressed by the above equation (7) which includes the amount of change $\Delta K$ of the spring constant K of the torsion spring 32. The disturbance $w_2$ is obtained as an estimated value $w_{2p}$. In addition to this estimated value $w_{2p}$, the observer 52 is adapted to obtain an estimated value $\omega_{Bp}$ of the angular velocity $\omega_B$ of the belt 30, and an estimated value $\theta_{RBp}$ of the torsion angle $\theta_{RB}$ between the rim 28 and the belt 30, which values $\omega_B$ and $\theta_{RB}$ cannot be detected or measured.

The correlation calculator 56 and the normalizer 58 will be described next.

The disturbance $w_{2p}$ and torsion angle $\theta_{RBp}$ estimated by the disturbance observer 52 are applied to the parameter calculator 53, wherein the estimated values $w_{2p}$ and $\theta_{RBp}$ are processed by the correlation calculator 56 and the normalizer 58, to obtain an amount of change of the spring constant K of the torsion spring 32.

Figure 7:
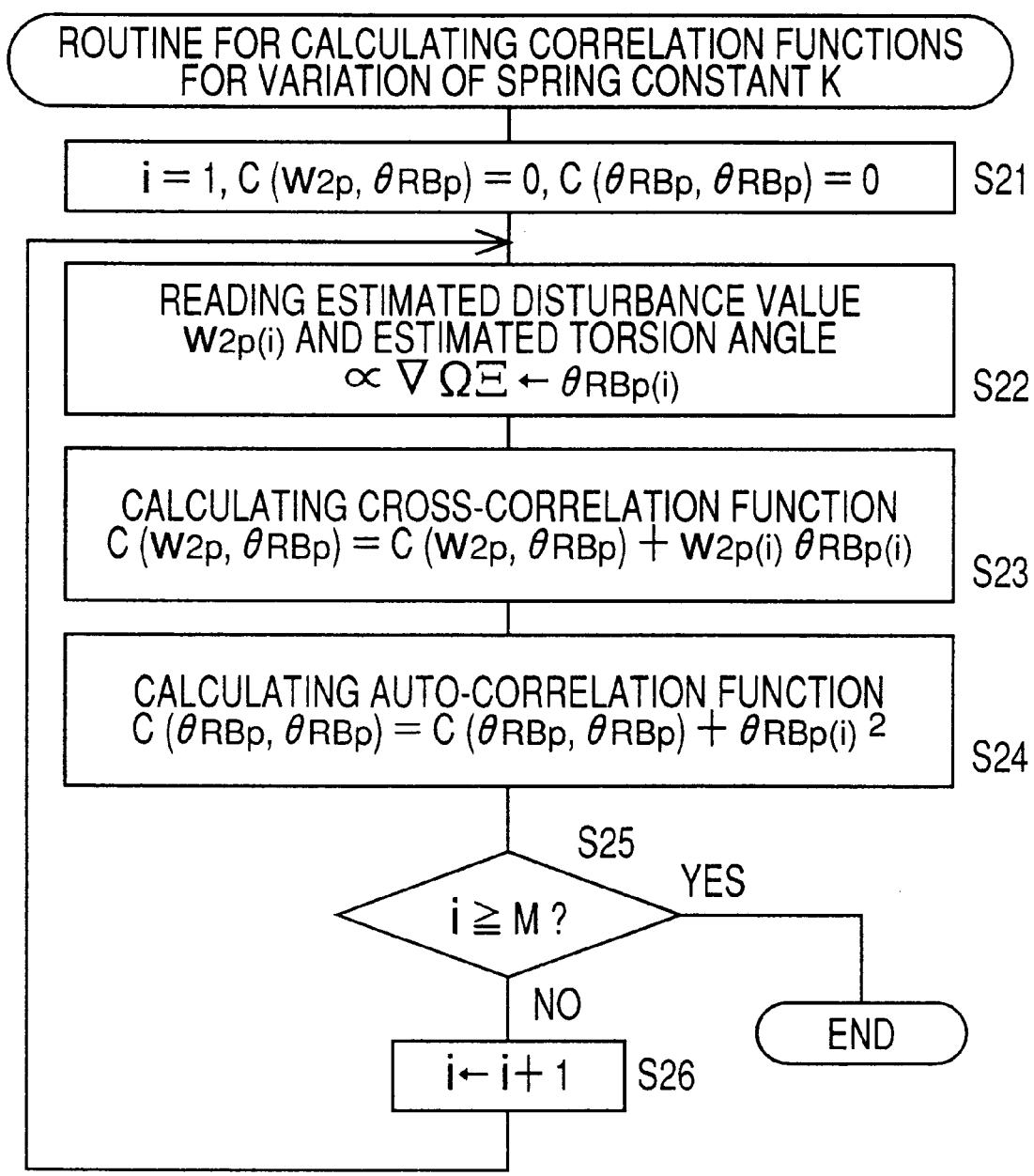
FIG. 7 is a flow chart illustrating a routine executed by the computer of the apparatus of FIG. 1, for calculating correlation functions for obtaining a spring constant variation of the tired wheel.

The correlation calculator 56 is adapted to execute the routine illustrated in the flow chart of FIG. 7, for calculating correlation functions to obtain the amount of change of the spring constant K.

The routine of FIG. 7 is initiated with step S21 to reset the integer "i" to "1", and reset correlation functions $C(w_{2p}, \theta_{RBp})$ and $C(\theta_{RBp}, \theta_{RBp})$ to "0". The correlation function $C(w_{2p}, \theta_{RBp})$ is a function of cross-correlation between the estimated value $w_{2p}$ of the disturbance $w_2$ expressed by the above equation (7) and the estimated value $\theta_{RBp}$ of the torsion angle $\theta_{RB}$, while the function $C(\theta_{RBp}, \theta_{RBp})$ is a function of auto-correlation of the estimated torsion angle value $\theta_{RBp}$. In other words, the contents of "cross-correlation" and "auto-correlation" memories of the RAM 50 are cleared in step S21.

Step S22 is then implemented to read the present estimated disturbance value $w_{2p(i)}$ and the present estimated torsion angle value $\theta_{RBP(i)}$. Step S22 is followed by step S23 to calculate a product of the estimated disturbance value $w_{2p(i)}$ and the estimated torsion angle value $\theta_{RBp(i)}$, and add the product to the last value of the cross-correlation function $C(w_{2p}, \theta_{RBp})$. In the first cycle of execution of the routine of FIG. 7, the last value of the cross-correlation function $C(w_{2p}, \theta_{RBp})$ is zero, and the above-indicated product $w_{2p(i)} \times \theta_{RBp(i)}$ is stored in the "cross-correlation" memory of the RAM 50.

The control then goes to step S24 to step S24 to obtain the square of the estimated torsion angle value $\theta_{RBp(i)}$ and add the obtained square to the last value of the auto-correlation function $C(\theta_{RBp}, \theta_{RBp})$ to thereby update the auto-correlation function $C(\theta_{RBp}, \theta_{RBp})$ The updated value is stored in the "auto-correlation" memory.

Step S25 is then implemented to determine whether the integer "i" is equal to or larger than a predetermined threshold "M". Initially, a negative decision (NO) is obtained in step S25, and the control flow goes to step S26 to increment the integer "i", and then returns to step S22. Steps S22 through S26 are repeatedly implemented until an affirmative decision (YES) is obtained in step S25.

The affirmative decision (YES) is obtained in step S25 when steps S22, S23 and S24 have been repeated the predetermined number of times "M". Thus, the cross-correlation function $C(w_{2p}, \theta_{RBp})$ and the auto-correlation function $c(\theta_{RBp}, \theta_{RBp})$ have been obtained by the correlation calculator 56.

After the cross-correlation function $C(w_{2p}, \theta_{RBp})$ and the auto-correlation function $C(\theta_{RBp}, \theta_{RBp})$ have been obtained by the correlation calculator 56, the normalizer 58 obtains a normalized value $L_k$ according to the following equation (13), and the obtained normalized value $L_k$ is stored in an $L_k$ memory of the RAM 50.

$$L_k = C(w_{2p}, \theta_{RBp})/C(\theta_{RBp}, \theta_{RBp}) \tag{13}$$

The value $L_k$ obtained according to the above equation (13) may be expressed by the following equation (14), on the basis of the above equation (7):

$$L_k = (-2/J_B)C_0 + \Delta K/J_B \tag{14}$$

Since the value $C_0$ is represented by $C(T_{dp}, \theta_{RBp})/C(\theta_{RBp}, \theta_{RBp})$ and is independent of a change of the spring constant K, the value $C_0$ may be obtained when the air pressure of the tire 26 is normal. It is noted that the value $C(T_{dp}, \theta_{RBp})$ is a function of the cross-correlation between the estimated value $T_{dp}$ of the disturbance torque $T_d$ and the estimated value $\theta_{RBp}$ of the torsion angle $\theta_{RB}$.

There will next be described the air pressure deviation calculator 60, the air pressure calculator 62 and the air pressure compensator 64.

The air pressure deviation calculator 60 is adapted to obtain the amount of change $\Delta K$ of the spring constant K of the torsion spring 32 on the basis of the normalized value $L_k = C(w_{2p}, \theta_{RBp})/C(\theta_{RBp}, \theta_{RBp})$, and determine an amount of deviation $\Delta P$ of an air pressure P of the tire 26 with respect to a nominal value $P_N$, on the basis of the thus obtained amount of change $\Delta K$. To this end, the ROM 49 of the computer 47 stores data representative of predetermined relationships among the normalized value $L_k$, amount of change $\Delta K$ and air pressure deviation $\Delta P$. The air pressure deviation calculator 60 determines the air pressure deviation $\Delta P$ corresponding to the normalized value $L_k$, according to the stored relationships. In this respect, it is noted that the amount of change $\Delta K$ of the spring constant K is linearly proportional to the normalized value $L_k$, without an influence of the air pressure deviation $\Delta P$, and that the air pressure deviation $\Delta P$ is linearly proportional to the amount of change $\Delta K$, without an influence of the normalized value. Accordingly, the air pressure deviation $\Delta P$ may be determined directly from the normalized value $L_k$ according to a predetermined relationship between these parameters $\Delta P$, $L_k$, without two-step determinations, namely, without a first determination of the amount of change $\Delta K$ from the normalized value $L_k$ and a second determination of the air pressure deviation $\Delta P$ from the amount of change $\Delta K$.

The air pressure calculator 62 is adapted to calculate the actual value of the tire pressure P by adding the determined air pressure deviation $\Delta P$ to the nominal value $P_N$. Thus, the actual tire pressure P is estimated primarily by the disturbance observer 52.

The air pressure compensator 64 is adapted to compensate the thus estimated actual tire pressure P on the basis of the ambient temperature t detected by the temperature sensor 70.

Figure 8:
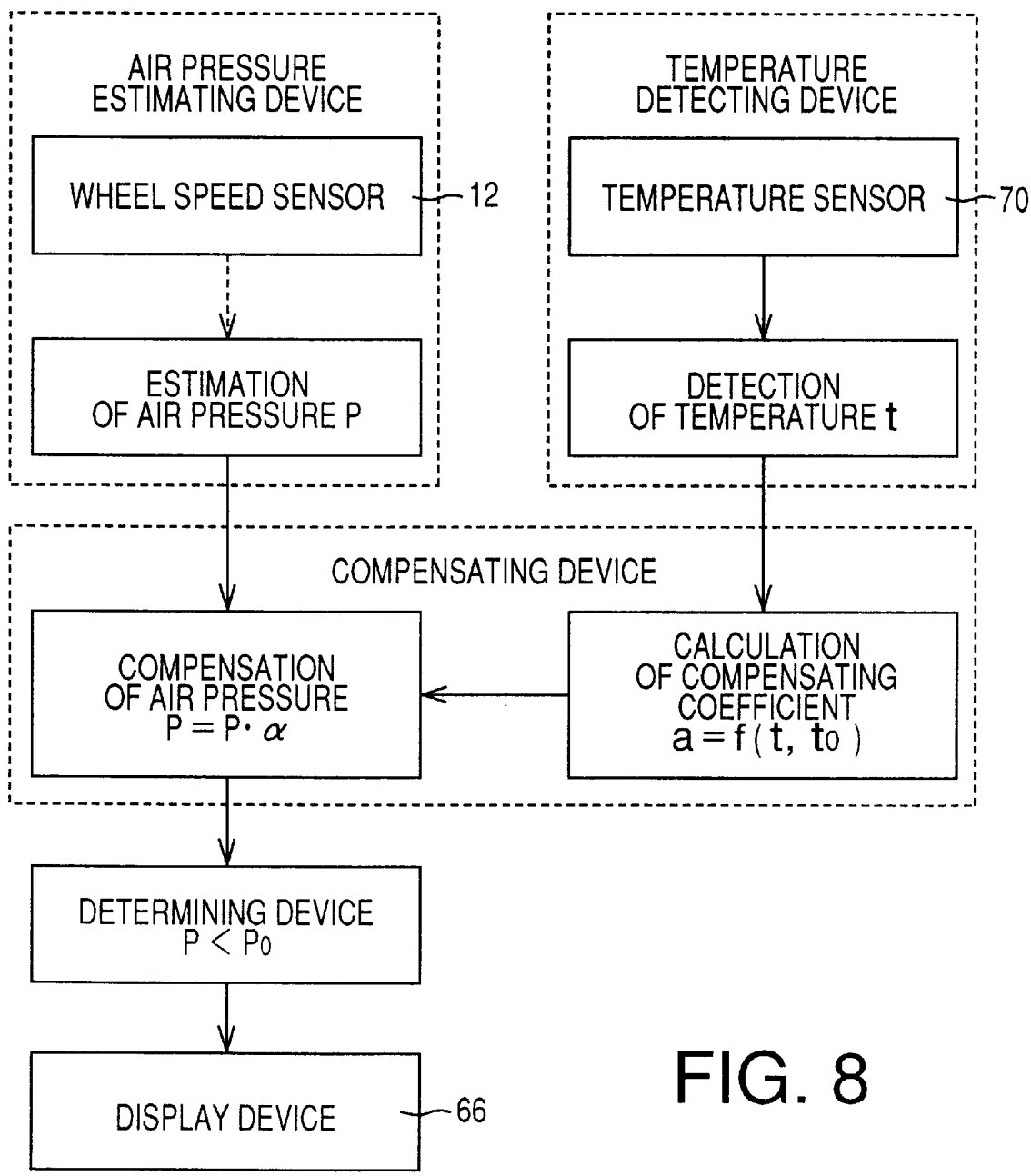
FIG. 8 is a block diagram schematically showing a principle of compensation of the tire air pressure by the apparatus of FIG. 1.
Figure 9:
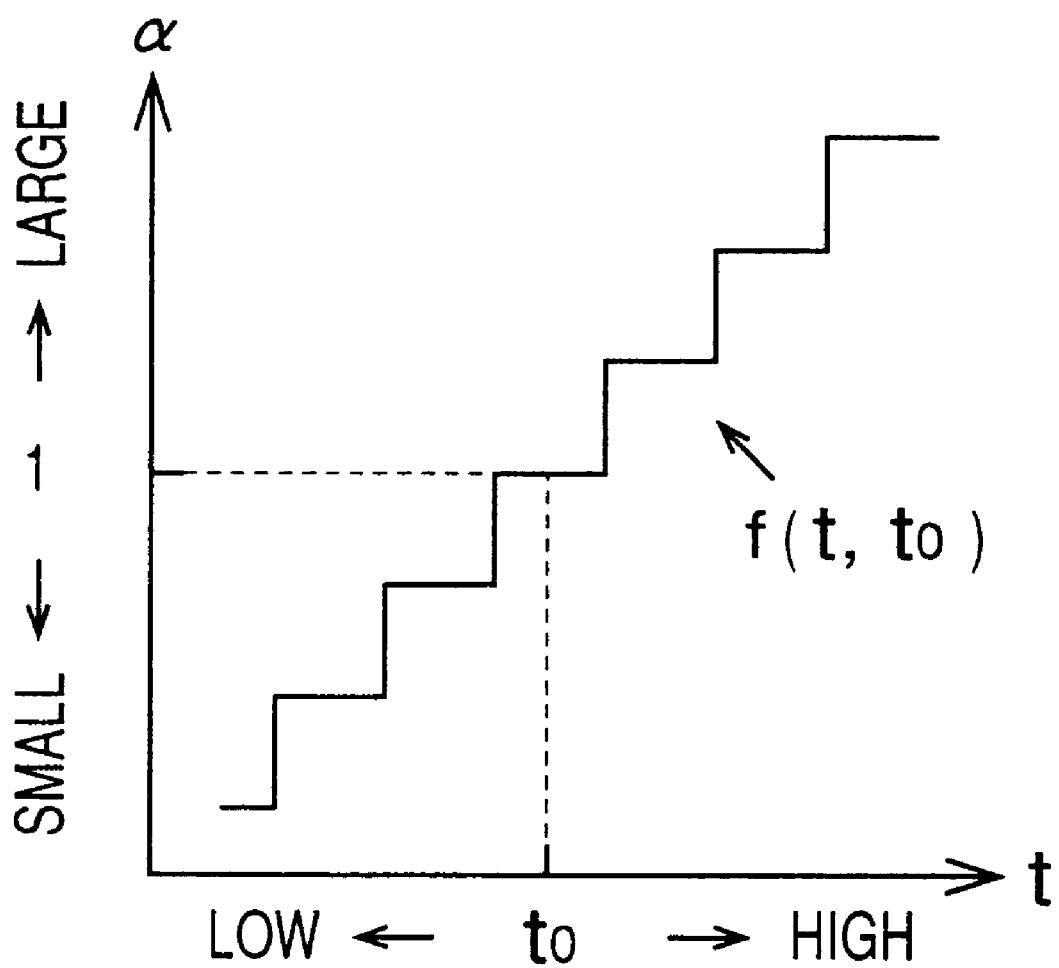
FIG. 9 is a graph for explaining the details of the compensation of the tire air pressure.

The principle of compensation of the air pressure P by the air pressure compensator 64 is schematically shown in the block diagram of FIG. 8. The compensation of the air pressure P is effected by multiplying the estimated value P by a compensating coefficient $\alpha$, which is obtained according to a function $f(t, t_0)$, where "t" and "$t_0$" represent the ambient temperature t and a reference value thereof, respectively. The function $f(t, t_0)$ is formulated such that the compensating coefficient a increases with an increase in the ambient temperature t and is equal to "1" when the ambient temperature t is equal to the reference value $t_0$. In the present embodiment, the function $f(t, t_0)$ is formulated to increase the compensating coefficient $\alpha$ in steps as the ambient temperature t increases. This function $f(t, t_0)$ is stored in a function memory of the ROM 49.

The reference value $t_0$ of the ambient temperature t may be an annual average temperature (e.g., 15° C.) in a region (e.g., Japan) in which the motor vehicle equipped with the tire air pressure abnormality detecting apparatus is expected to be used. Alternatively, the reference value $t_0$ may be an upper limit temperature (e.g., 50° C.) which cannot be exceeded in the relevant region (e.g., Japan). In the latter case, the function $f(t, t_0)$ is formulated so that the compensating coefficient α is not larger than "1".

The abnormality determining processor 65 is adapted to compare the compensated air pressure value P of the tire 26 with a threshold $P_0$. If a decision by the abnormality determining processor 65 that the value P is lower than the threshold $P_0$ is obtained consecutively more than a predetermined number of times "N", the abnormality determining processor 65 determines that the air pressure P of the tire 26 is abnormally low, and commands the display device 66 to inform the vehicle operator of this fact.

While the functions of the disturbance observer 52, correlation calculator 56, normalizer 58, air pressure deviation calculator 60, air pressure calculator 62, air pressure compensator 64 and abnormality determining processor 65 have been described above, the operation of the computer 47 incorporating those individual functional elements 52, 56, 58, 60, 62, 64, 65 will be described by reference to the flow chart of FIG. 5, which illustrates the routine for detecting abnormality of the air pressure P of the tire 26.

Figure 5:
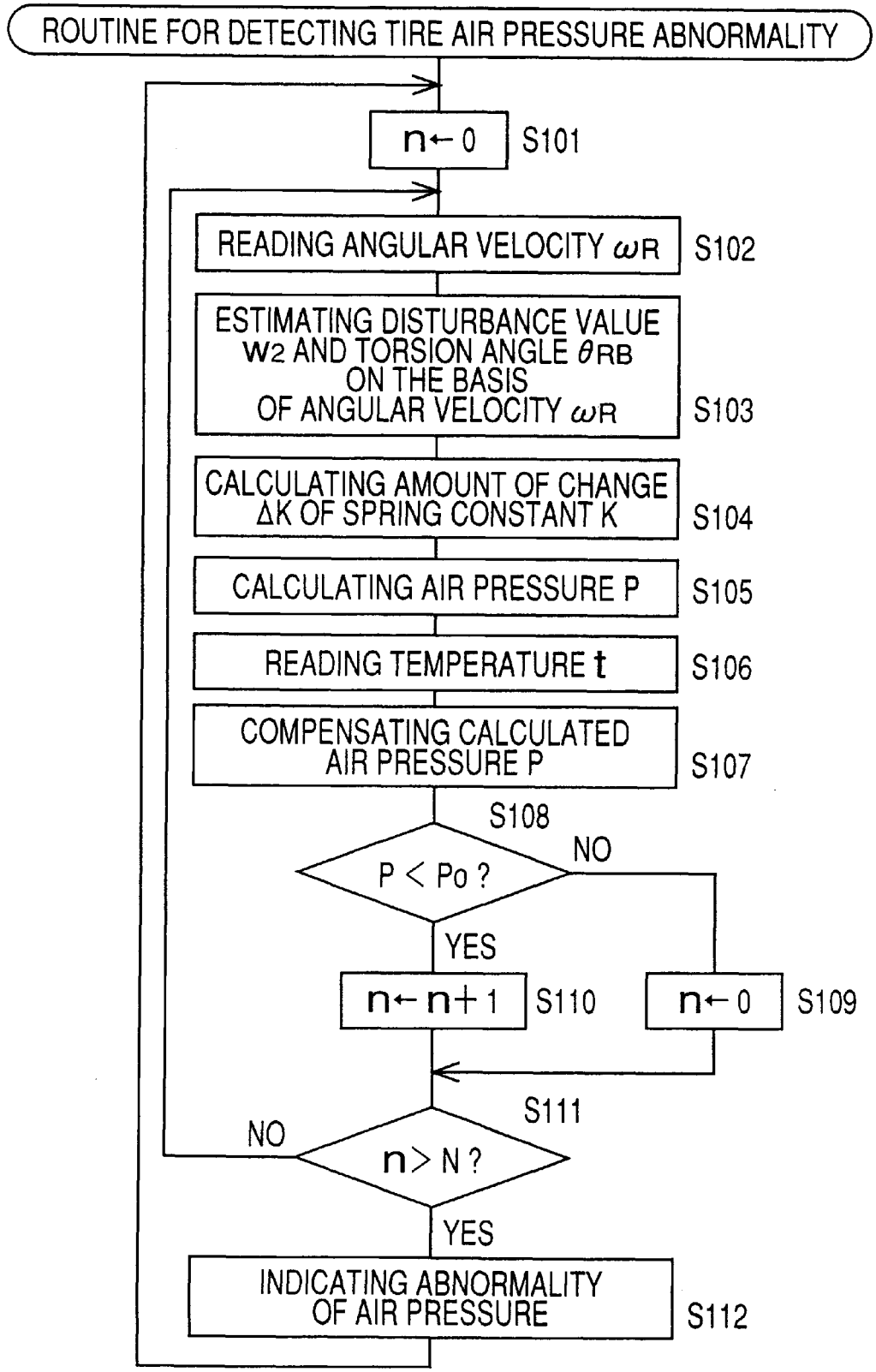
FIG. 5 is a flow chart illustrating a routine executed by a computer of the apparatus of FIG. 1, for detecting abnormality of the tire air pressure.

The tire air pressure abnormality detecting routine of FIG. 5 is initiated with step S101 to reset an integer "n" to "0". Then, the control flow goes to step S102 to receive the angular velocity $\omega_R$ of the rim 28 from the computer 20. Step S102 is followed by step S103 in which the disturbance $w_2$ and the torsion angle $\theta_{RB}$ are estimated by the disturbance observer 52, on the basis of the angular velocity $\omega_R$. The control flow then goes to step S104 in which the correlation calculator 56 and the normalizer 58 obtain the normalized value $L_k$, and the air pressure deviation calculator 60 calculates the amount of change ΔK of the spring constant K on the basis of the obtained normalized value $L_k$, and obtains the deviation ΔP of the air pressure P on the basis of the amount of change ΔK.

Step S104 is followed by step S105 in which the air pressure calculator 62 calculates the actual air pressure value P of the tire 26 on the basis of the air pressure deviation ΔP and the nominal value $P_N$. Then, the control flow goes to step S106 to receive the ambient temperature t from the temperature sensor 70, and to step S107 in which the air pressure compensator 64 calculates the compensating coefficient α on the basis of the detected ambient temperature t and the reference temperature value to and according to the function $f(t, t_0)$, and compensates the air pressure P by multiplication thereof by the calculated compensating coefficient α.

Then, step S108 is implemented to determine whether the compensated air pressure P is lower than the threshold $P_0$, namely, whether the air pressure P of the tire 26 is abnormally low or not. If a negative decision (NO) is obtained in step S108, the control flow goes to step S109 to reset the integer "n" to "0". If an affirmative decision (YES) is obtained in step S108, the control flow goes to step S110 to increment the integer "n". Steps S109 and S110 are followed by step S111 to determine whether the integer "n" is larger than a threshold "N". If a negative decision (NO) is obtained in step S111, it means that the air pressure P is not abnormally low. In this case, the control goes back to step S102. If an affirmative decision (YES) is obtained in step S111, it means that the air pressure P is abnormally low. In this case, the control flow goes to step S112 in which the display device 66 is activated to inform the vehicle operator that the air pressure P of the tire 26 is abnormally low. Step S112 is followed by step S101.

It will be understood that a portion of the computer 47 assigned to implement step S103 constitutes the disturbance observer 52, while a portion of the computer 47 assigned to implement steps S104 constitutes the correlation calculator 56, normalizer 58 and air pressure deviation calculator 60. It will also be understood that a portion of the computer 47 assigned to implement step S105 constitutes the air pressure calculator 62, and a portion of the computer 47 assigned to implement steps S106 and S107 constitutes the air pressure compensator 64, while a portion of the computer 47 assigned to implement steps S101 and S108–S112 constitutes the abnormality determining processor 65.

In the present embodiment, the wheel speed sensor (magnetic pickup) 12 is an example of a wheel motion sensor for detecting a motion of the tired wheel 14, and the temperature sensor 70 is an example of a temperature-related variable sensor for detecting a temperature-related variable related to the temperature of the tire 26. It is also noted that the disturbance observer 52, correlation calculator 56, normalizer 58, air pressure deviation calculator 60 and air pressure calculator 62 cooperate with each other to constitute provisional value calculating means for calculating a provisional value of the air pressure P of the tire 26, while the air pressure compensator 64 constitutes provisional value compensating means for compensating the provisional value of the air pressure P on the basis of the variable related to the tire temperature t and the reference value $t_0$. The provisional value calculating means and the provisional value compensating means cooperate to constitute estimating means for estimating the air pressure P on the basis of the temperature of the tire 26 as well as the motion of the tired wheel 14.

Figure 10:
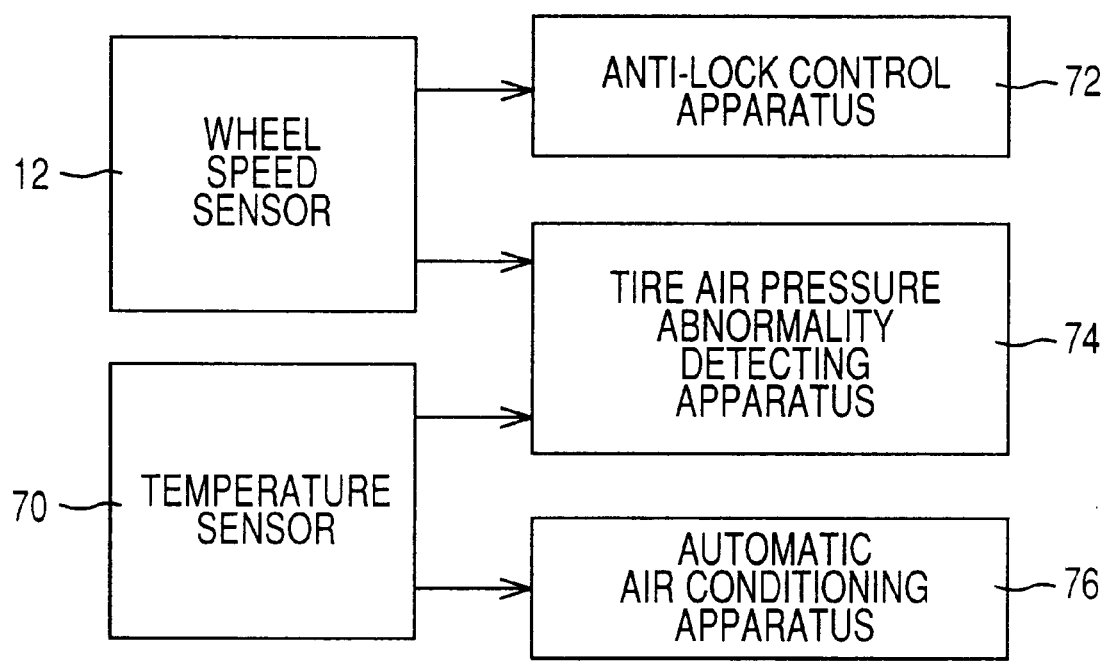
FIG. 10 is a block diagram for explaining a relationship of the apparatus of FIG. 1 with an anti-lock brake control apparatus and an air conditioning apparatus which are installed on a motor vehicle, together with the apparatus of FIG. 1.

The motor vehicle on which the tire air pressure abnormality detecting apparatus is provided as indicated at 74 in FIG. 10 is also provided with a wheel control apparatus in the form of an anti-lock brake control apparatus 72. Like the abnormality detecting apparatus 74, the anti-lock brake control apparatus 72 uses the output of the wheel speed sensor 12, as shown in FIG. 10. The vehicle is further provided with an automatic air conditioning apparatus 76. Like the abnormality detecting apparatus 74, the automatic air conditioning apparatus 76 uses the output of the temperature sensor 70, as also shown in FIG. 10. In other words, the tire air pressure abnormality detecting apparatus 74 utilizes the wheel speed sensor 12 and the temperature sensor 70 which are provided for the anti-lock brake control apparatus 72 and the automatic air conditioning device 76. In the present embodiment, therefore, the abnormality detecting apparatus 74 does not require hardwares exclusively used for detecting abnormality of the air pressure P of the tire 26, and is accordingly available at a relatively low cost by simply adding a suitable software or modifying the existing software.

Figure 11:
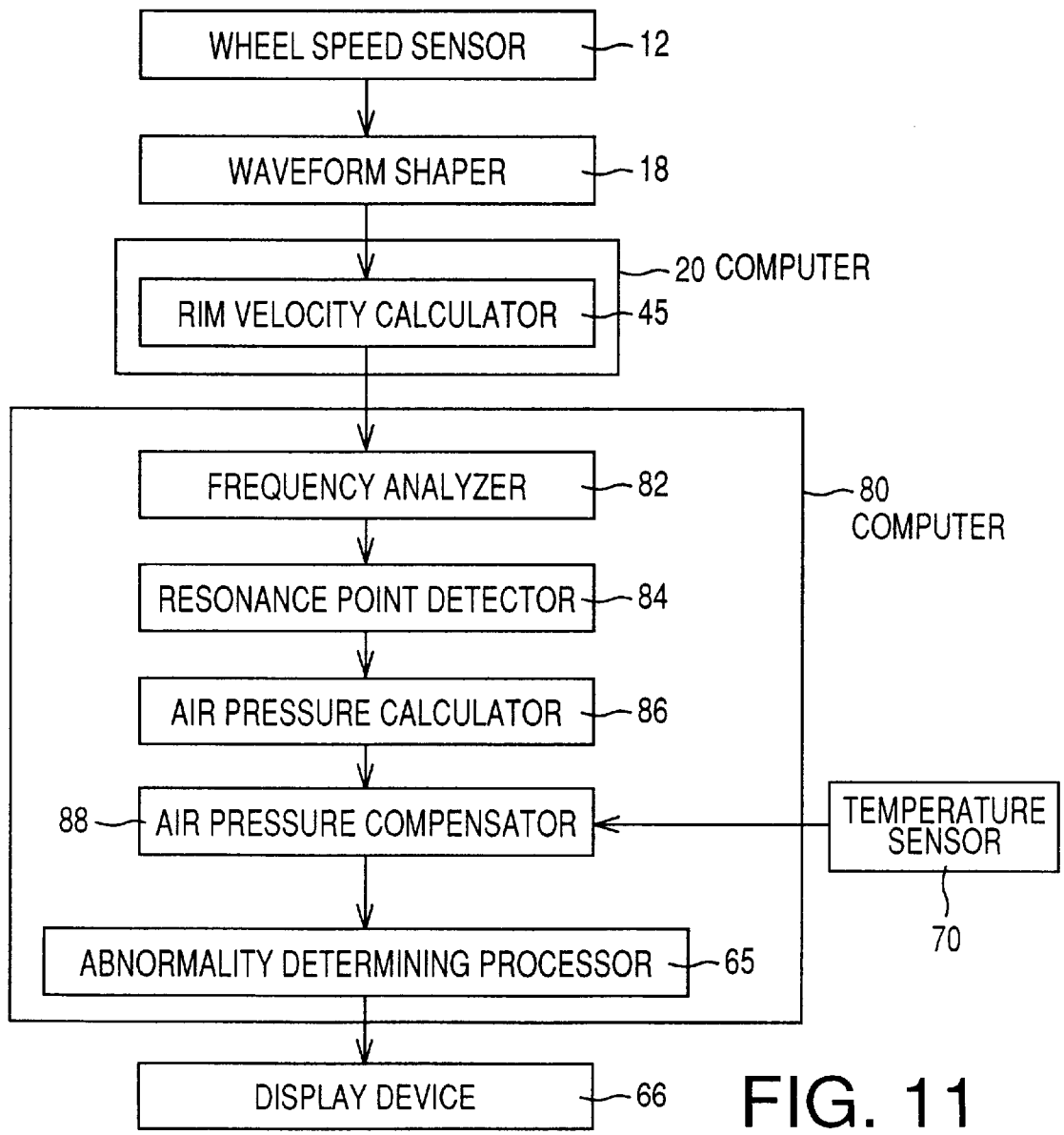
FIG. 11 is a block diagram illustrating functional elements of a vehicle tire air pressure abnormality detecting apparatus according to another embodiment of this invention.
Figure 12:
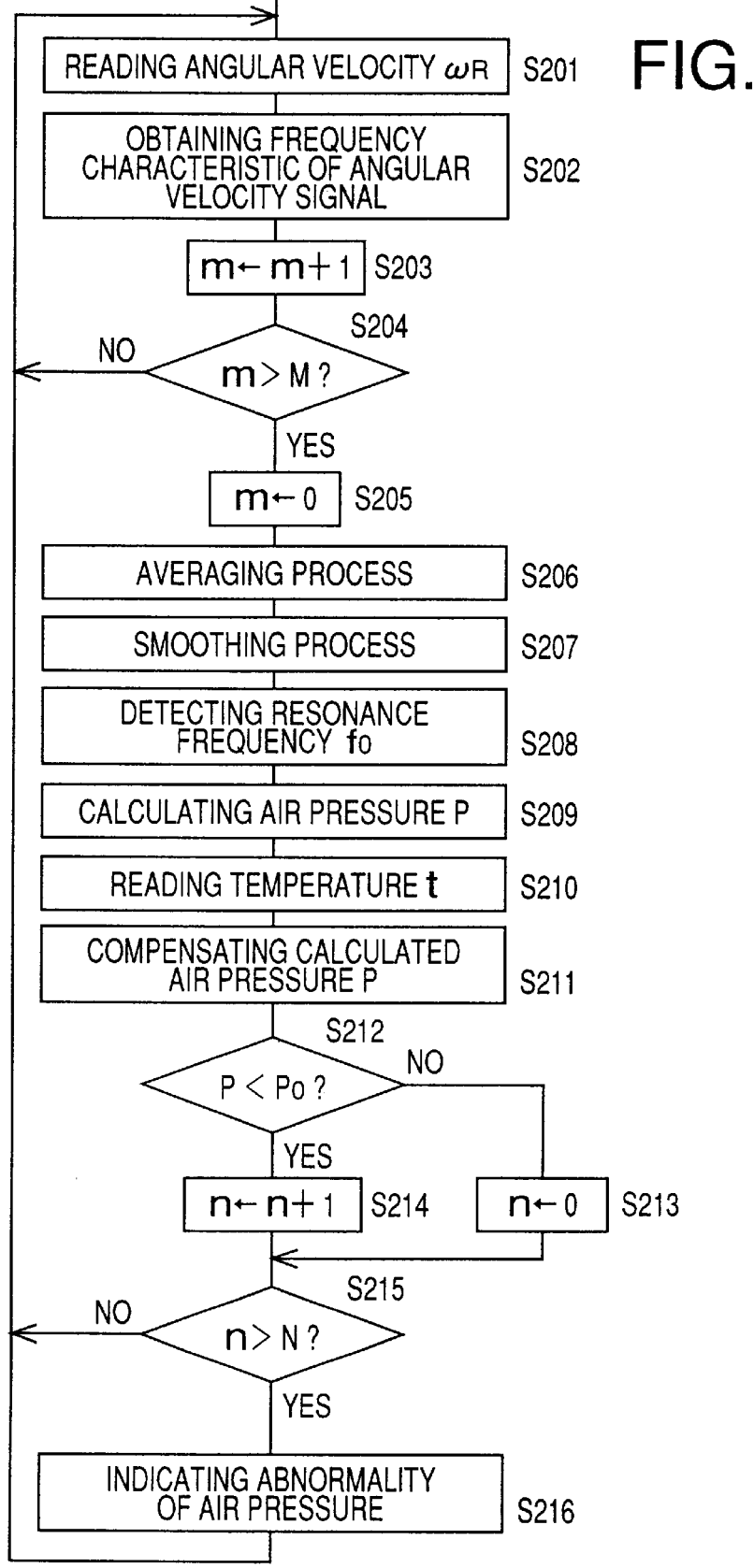
FIG. 12 is a flow chart executed by a computer of the apparatus of FIG. 11, for detecting abnormality of the tire air pressure.

Referring next to FIGS. 11 and 12, there will be described a second embodiment of this invention. In FIGS. 11 and 12, the same reference numerals and characters as used in the first embodiment will be used to identify the corresponding elements, and redundant description of these elements will not be provided in the interest of simplification of the explanation.

The tire air pressure abnormality detecting apparatus according to the present second embodiment is different from that of the first embodiment, in that the disturbance observer 52 is not used to estimate the tire air pressure P. Described more specifically, the tire air pressure abnormality detecting apparatus of the second embodiment is adapted to estimate the air pressure P on the basis of a fact that the air pressure P of the tire 26 decreases with a decrease in the frequency of a selected one of a plurality of frequency components of the angular velocity ω of the tired wheel 14, which angular velocity ω is an example of a variable indicative of the motion of the wheel 14. The selected frequency component indicated above of the angular velocity ω has a frequency within a predetermined range, and has the largest intensity of all the frequency components within the predetermined range. The abnormality detecting apparatus of this second embodiment uses a computer 80 which incorporates a frequency analyzer 82, a resonance point detector 84, an air pressure calculator 86, an air pressure compensator 88 and the abnormality determining processor 65, as shown in the block diagram of FIG. 11.

The frequency analyzer 82 is adapted to obtain a frequency characteristic of the angular velocity ω of the tired wheel 14 received from the computer 30, by practicing a so-called "Fast Fourier Transform (FFT)" method, which employs the Cooley-Tukey algorithm to reduce the number of operations.

The resonance point detector 84 is adapted to obtain a resonance frequency $f_0$ (resonance point) on the basis of the frequency characteristic of the angular velocity ω of the wheel 14 obtained by the frequency analyzer 82. The resonance frequency $f_0$ is used as the largest-intensity frequency at which the intensity of the angular velocity signal is the largest within the predetermined frequency range.

The air pressure calculator 86 is adapted to calculate the air pressure P on the basis of the resonance frequency $f_0$ obtained by the resonance point detector 84, and according to a predetermined relationship between the air pressure P and the resonance frequency $f_0$, which relationship is formulated such that the air pressure P decreases with a decrease in the resonance frequency $f_0$.

Like the air pressure compensator 64 in the first embodiment, the air pressure compensator 88 in the present second embodiment is adapted to determine the compensating coefficient α on the basis of the ambient temperature t detected by the temperature sensor 70, and the reference value $t_0$, and according to the function f (t, $t_0$), and compensate the air pressure P by multiplication thereof by the compensating coefficient α.

The frequency analyzer 82, resonance point detector 84, air pressure calculator 86 and air pressure compensator 88 which have been described above, and the abnormality determining processor 65 are constituted by a portion of the computer 80 which is assigned to implement a routine illustrated in the flow chart of FIG. 12, for detecting abnormality of the air pressure P of the tire 26. While the routine of FIG. 12 will be described, steps in this routine which are similar to those in FIG. 5 will be explained briefly.

The routine of FIG. 12 is initiated with step S201 to receive from the computer 20 the angular velocity signal indicative of the angular velocity ω of the tired wheel 14, and store the angular velocity signal in an angular velocity memory of the RAM 50. Step S201 is followed by step S202 in which the frequency analyzer 82 obtains the frequency characteristic (relationship between the frequency and gain) of the angular velocity signals stored in the angular velocity memory. Then, the control flow goes to step S203 to increment an integer "m" which indicates the number of times of implementation of step S202. The integer "m" is reset to "0" upon initiation of the present routine. Step S203 is followed by step S204 to determine whether the integer "m" is larger than a predetermined threshold "M". If a negative decision (NO) is obtained in step S204, the control flow goes back to step S201.

If an affirmative decision (YES) is obtained in step S204 with the integer "m" becoming larger than the threshold "M" as a result of repeated implementation of steps S201 through S204, the control flow goes to step S205 to reset the integer "m" to "0", and to step S206 in which the gains at the same frequencies of the frequency characteristics obtained by analysis in step S202 are averaged. Step S206 is followed by step S207 in which the averages of the gains obtained in step S206 are smoothed, according to the following equation, for example:

$$Yi=(Y_{i-1}+Y_i+Y_{i+1})/3$$

where

Yi: gain whose intensity has an order represented by "i" as counted from the largest value, $Y_{i-1}$: gain whose intensity before smoothing has an order represented by "i−1", $Y_i$: gain whose intensity before smoothing has an order represented by "i", $Y_{i+1}$: gain whose intensity before smoothing has an order represented by "i+1", While the three gains are used in the above equation, the number of the gains used for the smoothing process in step S207 may be selected as desired.

Then, the control flow goes to step S208 in which the resonance point detector 84 determines, as the resonance frequency $f_0$, the frequency at which the intensity (in the form of the smoothed gain) of the angular velocity signal is the largest within the predetermined frequency range. Step S208 is followed by step S209 to calculate the air pressure P of the tire 26, on the basis of the determined resonance frequency $f_0$ and according to the predetermined relationship between the resonance frequency $f_0$ and the air pressure P, which relationship is stored in the ROM of the computer 80.

Then, the control flow goes to step S210 to receive the ambient temperature t from the temperature sensor 70, and step S211 to calculate the compensating coefficient α on the basis of the detected ambient temperature t and the reference value $t_0$, and according to the predetermined function f, and compensate the air pressure P by multiplying the value calculated in step S209 by the calculated compensating coefficient α. Steps S212–S216 are then implemented in the same manner as in steps S108–S112 of the first embodiment of FIG. 5.

It will be understood from the above description of the second embodiment that a portion of the computer 80 assigned to implement steps S202–S205 constitutes the frequency analyzer 82, and a portion of the computer 80 assigned to implement steps S206–S208 constitutes the resonance point detector 84, while a portion of the computer 80 assigned to implement step S209 constitutes the air pressure calculator 86. It will also be understood that a portion of the computer 80 assigned to implement steps S210 and S211 constitutes the air pressure compensator 88, and a portion of the computer 80 assigned to implement steps S212–S216 constitutes the abnormality determining processor 65.

In the present second embodiment, too, the wheel speed sensor 12 serves as the wheel motion sensor, while the temperature sensor 70 serves as the temperature-related variable sensor. It is also noted that the frequency analyzer 82, the resonance point detector 84 and the air pressure calculator 86 cooperate with each other to constitute the provisional value calculating means, while the air pressure compensator 88 constitutes the provisional value compensating means. The provisional value calculating means and the provisional value compensating means cooperate to constitute the estimating means for estimating the air pressure P.

Figure 13:
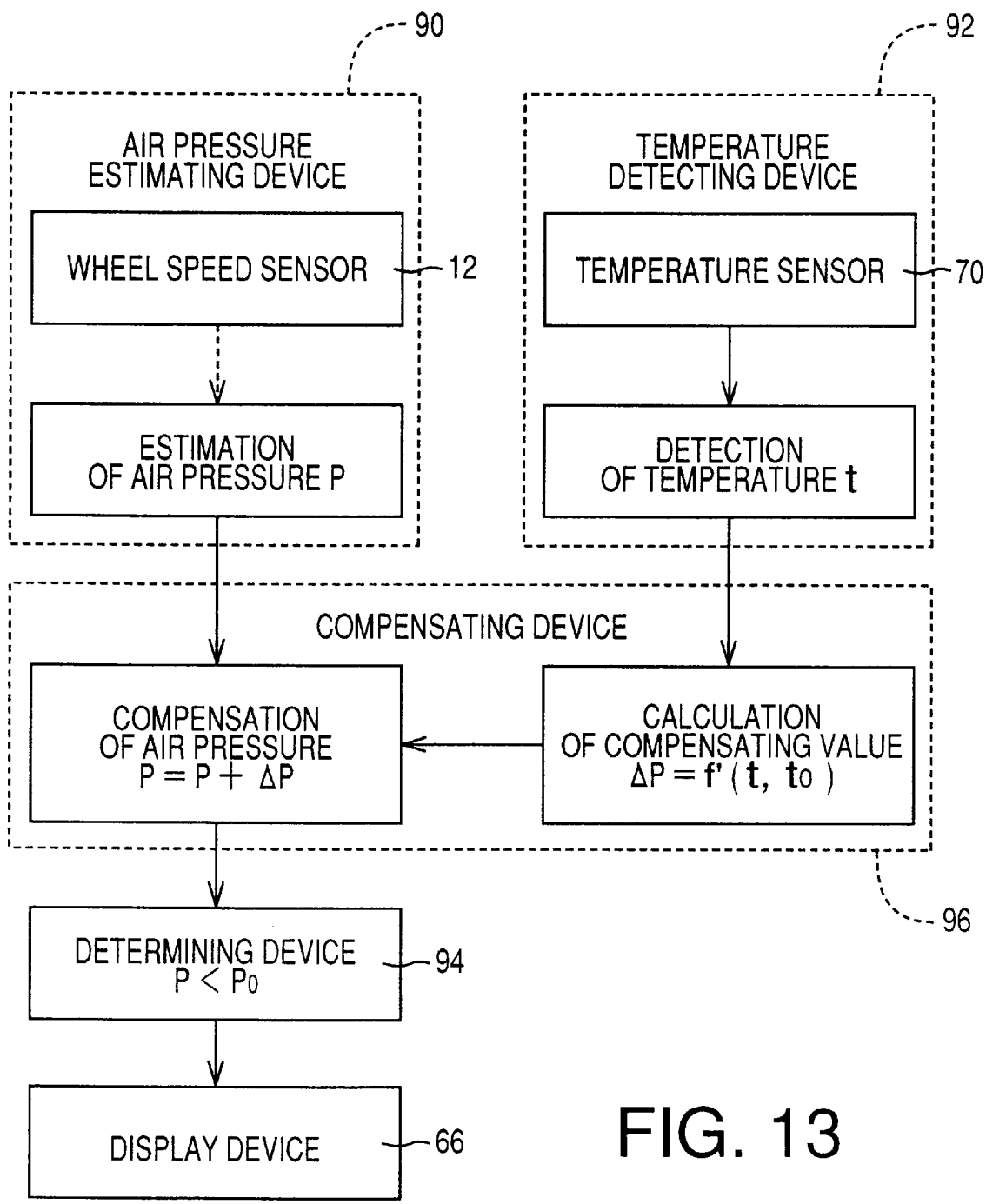
FIG. 13 is a block diagram illustrating functional elements of a vehicle tire air pressure abnormality detecting apparatus according to a further embodiment of this invention.
Figure 14:
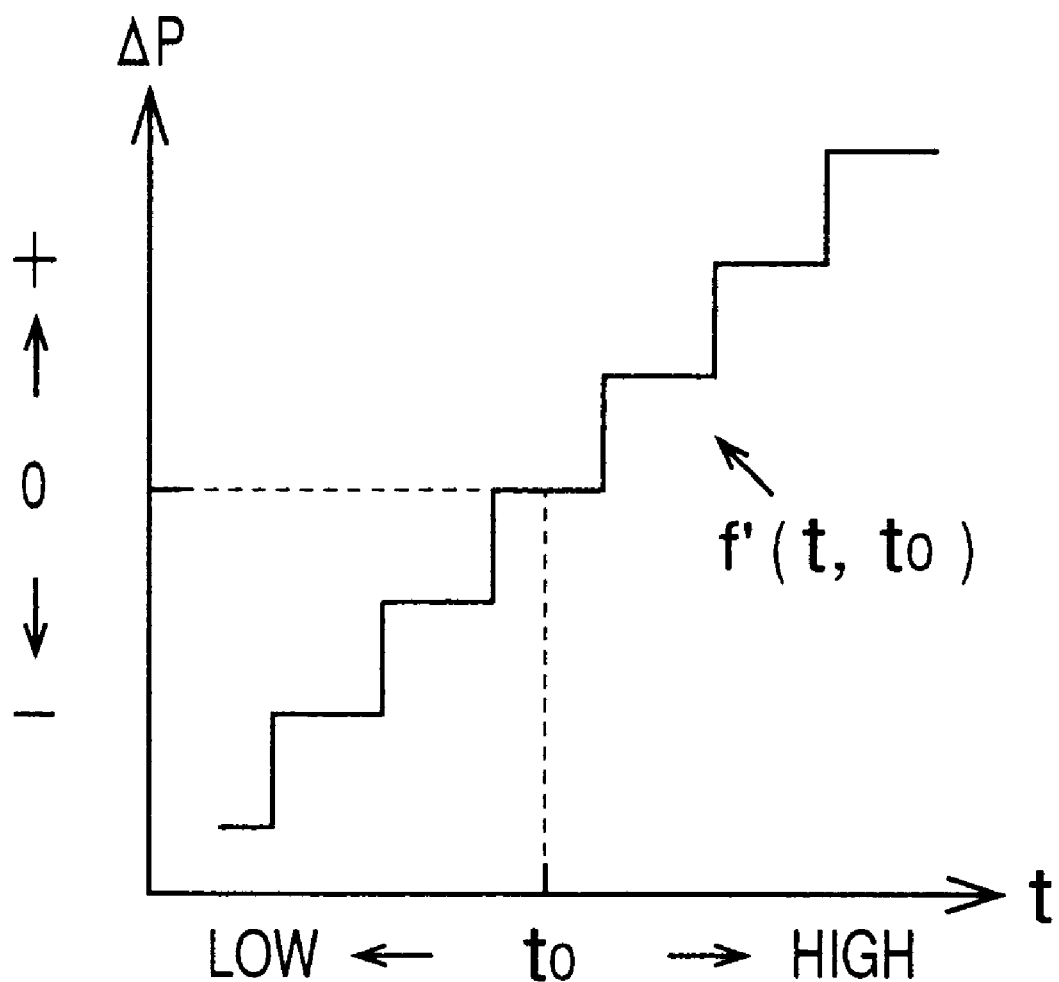
FIG. 14 is a graph for explaining the details of compensation of estimated tire air pressure in the embodiment of FIG. 13.

Referring to FIGS. 13 and 14, there will be described a tire air pressure abnormality detecting apparatus constructed according to a third embodiment of this invention, which includes an air pressure estimating device 90, a temperature detecting device 92, a determining device 94 and a compensating device 96.

The air pressure estimating device 90 includes the wheel speed sensor 12, and is adapted to indirectly estimate the tire air pressure P on the basis of the output of the wheel speed sensor 12, by utilizing a disturbance observer or a relationship between the resonance frequency $f_0$ of the motion of the tired wheel 14 and the air pressure P of the tire 26.

The temperature detecting device 92 is adapted to detect the ambient temperature t on the basis of the output of the temperature sensor 70.

The determining device 94 is adapted to determine that the air pressure P is abnormally low, and activate the display device 66 to inform the vehicle operator of this fact, if the estimated air pressure P is lower than the threshold $P_0$.

The compensating device 96 is connected between the air pressure estimating and temperature detecting devices 90, 92 and the determining device 94, and is adapted to compensate the estimated air pressure P on the basis of the ambient temperature t. The compensation of the air pressure P by the compensating device 96 is effected by adding a compensating amount $\Delta P$ to a provisional value in the form of the estimated air pressure P. The compensating amount $\Delta P$ is obtained on the basis of the detected temperature t and the reference value $t_0$, and according to a predetermined function f representing a relationship between the compensating amount $\Delta P$ and the temperature t. The function f $(t, t_0)$ is formulated such that the compensating amount $\Delta P$ is a positive value when the temperature t is higher than the reference value $t_0$, and is a negative value when the temperature t is lower than the reference value $t_0$, and such that the absolute value of the compensating amount $\Delta P$ increases with an increase in the temperature t when the temperature t is higher than the reference value $t_0$, and with a decrease in the temperature t when the temperature t is lower than the reference value $t_0$. In the present embodiment, the function f is formulated so as to increase the compensating amount $\Delta P$ in steps as the temperature t increases, as indicated in the graph of FIG. 14.

In the present third embodiment, too, the wheel speed sensor 12 serves as the wheel motion sensor, while the temperature detecting device 92 including the temperature sensor 70 serves as the temperature-related variable sensor. It is also noted that the air pressure estimating device 90 serves as the provisional value calculating means, and the air pressure compensating device 96 serves as the provisional value compensating means. The provisional value calculating means cooperates with the provisional value compensating means to constitute the estimating means for estimating the air pressure P. Further, the determining device 94 serves as determining means for determining whether the air pressure P is abnormal or not.

Although the third embodiment is arranged to compensate the estimated air pressure P by adding the compensating amount $\Delta P$ to the estimated air pressure P, the air pressure P may be compensated by adding the compensating amount $\Delta P$ to the air pressure deviation $\Delta P$ which has been described above with respect to step S105 of the first embodiment.

While the first, second and third embodiments are adapted to increase the compensating coefficient $\alpha$ or compensating amount $\Delta P$ with an increase in the ambient temperature t, the compensating coefficient $\alpha$ or amount $\Delta P$ may be increased continuously in a linearly proportional relationship with the ambient temperature t.

Figure 15:
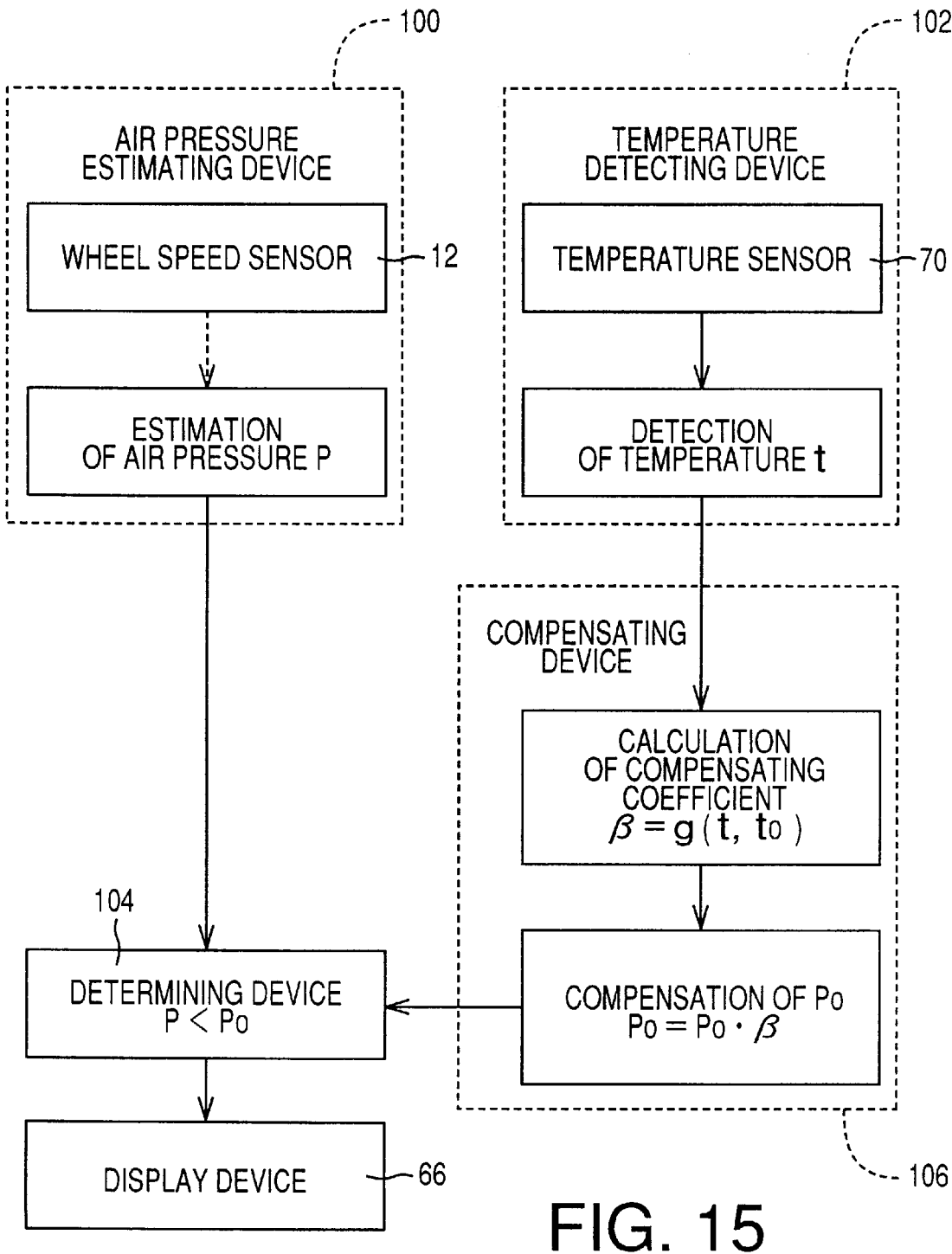
FIG. 15 is a block diagram illustrating functional elements of a vehicle tire air pressure abnormality detecting apparatus according to a still further embodiment of the invention.
Figure 16:
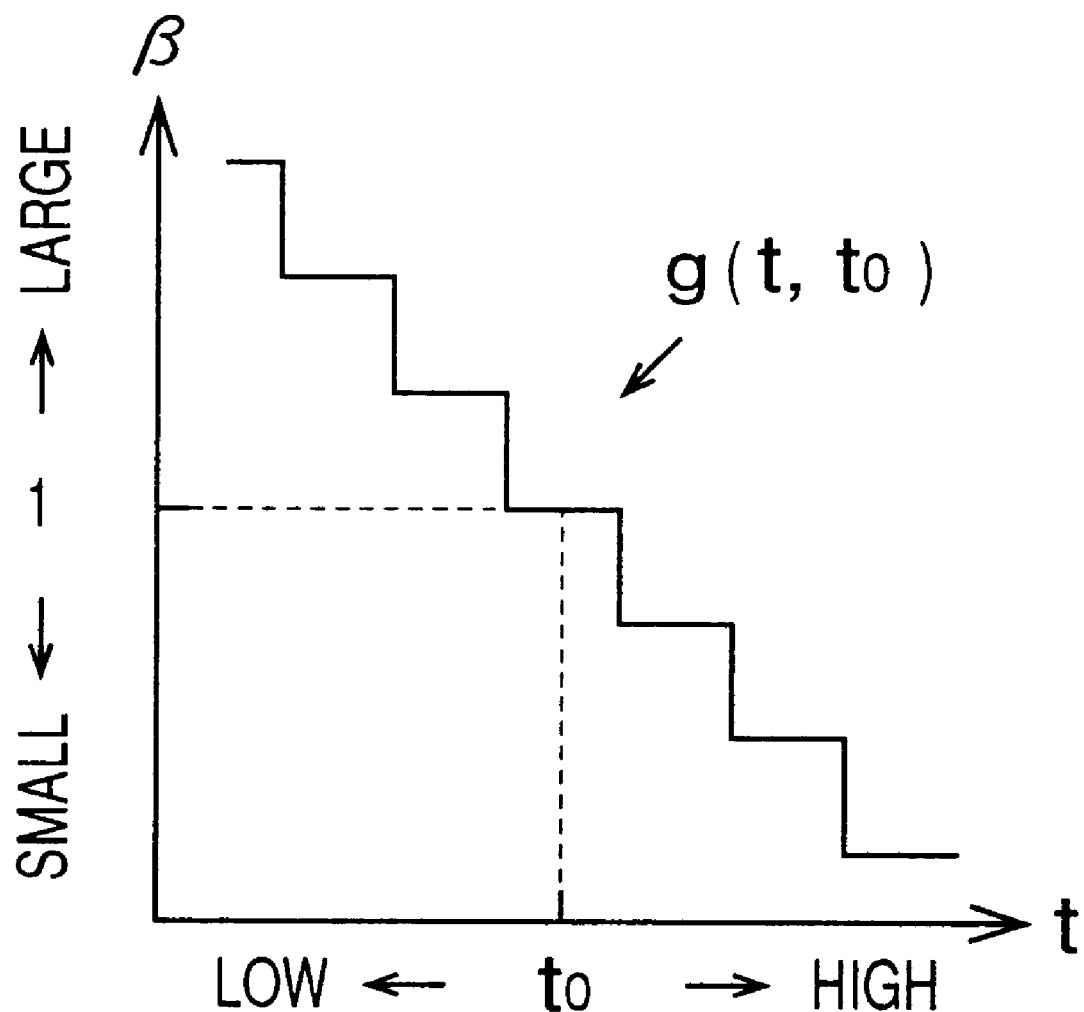
FIG. 16 is a graph for explaining the details of compensation of air pressure value in the apparatus of FIG. 15.

Referring to FIGS. 15 and 16, there will be described a tire air pressure abnormality detecting apparatus constructed according to a fourth embodiment of this invention, which includes an air pressure estimating device 100, a temperature detecting device 102, a determining device 104 and a compensating device 106. Since the air pressure estimating device 100, temperature detecting device 102 and determining device 104 are identical with the devices 90, 92, 94 of the third embodiment of FIG. 13, only the compensating device 106 will be described.

The compensating device 106 is connected between the temperature detecting device 102 and the determining device 104, and is adapted to compensate a threshold $P_0$ used by the determining device 104. Described in detail, the threshold $P_0$ is compensated by multiplication thereof by a compensating coefficient $\beta$. The compensating coefficient $\beta$ is determined on the basis of the ambient temperature t and the reference value $t_0$ and according to a function $g(t, t_0)$, which is formulated such that the compensating coefficient $\beta$ decreases with an increase in the temperature t, and such that the compensating coefficient $\beta$ is equal to "1" when the detected temperature t is equal to the reference value $t_0$.

In the present fourth embodiment, the function $g(t, t_0)$ is formulated such that the compensating coefficient $\beta$ decreases in steps as the ambient temperature t increases.

In the present fourth embodiment, too, the wheel speed sensor 12 serves as the wheel motion sensor, while the temperature detecting device 102 including the temperature sensor 70 serves as the temperature-related variable sensor. It is also noted that the air pressure estimating device 100 serves as the provisional value calculating means, and the compensating device 106 serves as the provisional value compensating means. The compensating device 106 also serves as compensating means for compensating the threshold $P_0$ on the basis of the detected temperature t. The provisional value calculating means cooperates with the provisional value compensating means to constitute the estimating means for estimating the air pressure. Further, the determining device 104 serves as determining means for determining whether the air pressure P is abnormal or not.

Figure 17:
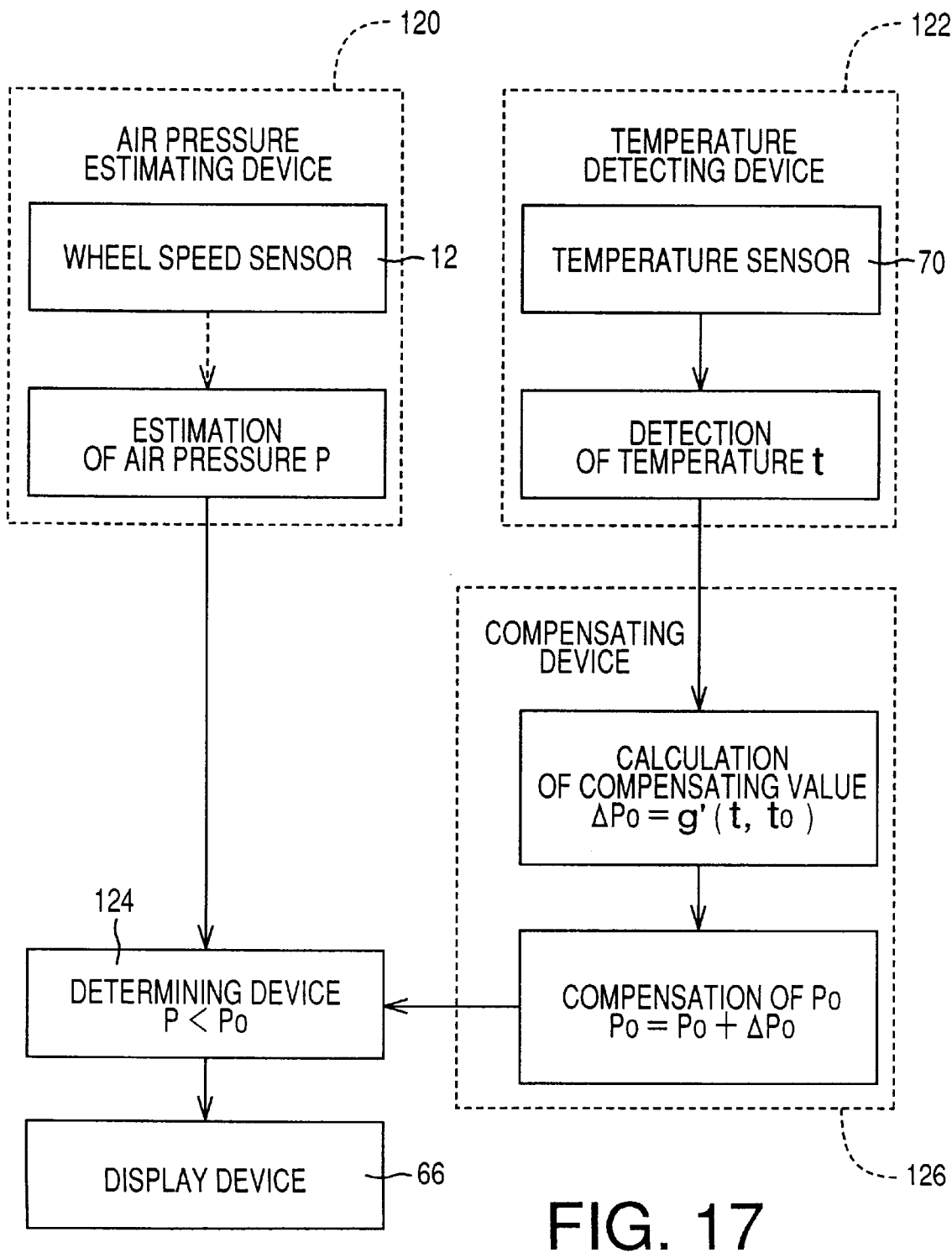
FIG. 17 is a block diagram illustrating functional elements of a vehicle tire air pressure abnormality detecting apparatus according to a yet further embodiment of this invention.

Referring next to FIGS. 17 and 18, there will be described a tire air pressure abnormality detecting apparatus constructed according to a fifth embodiment of this invention, which includes an air pressure estimating device 120, a temperature detecting device 122, a determining device 124 and a compensating device 126. Since the air pressure estimating device 120, temperature detecting device 122 and determining device 124 are identical with the devices 90, 92, 94 of the third embodiment of FIG. 13, only the compensating device 126 will be described.

The compensating device 126 is connected between the temperature detecting device 122 and the determining device 124, and is adapted to compensate a threshold $P_0$ used by the determining device 124. Described in detail, the threshold $P_0$ is compensated by multiplication thereof by a compensating amount $\Delta P_0$. The compensating amount $\Delta P_0$ is determined on the basis of the ambient temperature t and the reference value $t_0$ and according to a function g' $(t, t_0)$, which is formulated such that the compensating amount $\Delta P_0$ is a positive value when the temperature t is higher than the reference value $t_0$, and is a negative value when the temperature t is lower than the reference value $t_0$, and such that the absolute value of the compensating amount $\Delta P_0$ increases with an increase in the temperature t when the temperature t is higher than the reference value $t_0$, and with a decrease in the temperature t when the temperature t is lower than the reference value $t_0$. In the present embodiment, the function g' is formulated so as to decrease the compensating amount $\Delta P_0$ in steps as the temperature t increases, as indicated in the graph of FIG. 18.

In this fifth embodiment, the compensating device 126 serves as the compensating means for compensating the threshold $P_0$ on the basis of the detected temperature t.

Although the fourth and fifth embodiments of FIGS. 15–18 are arranged such that the compensating coefficient β or amount $\Delta P_0$ changes in steps with an increase in the temperature t, the compensating coefficient β or amount $\Delta P_0$ may be changed continuously in a linearly proportional relationship with the temperature t.

While the presently preferred embodiments of this invention have been described above in detail by reference to the accompanying drawings, it is to be understood that the invention may be embodied with various changes, modifications and improvements, which may occur to those skilled in the art, without departing from the spirit and scope of the invention defined in the following claims:

What is claimed is:

1. An apparatus for estimating an air pressure of a tire of a tired wheel of a motor vehicle, on the basis of a motion of said tired wheel, said apparatus comprising:

a wheel motion sensor for detecting the motion of said tired wheel;

a temperature-related variable sensor for detecting a temperature-related variable related to said temperature of said tire; and estimating means for estimating the air pressure of said tire on the basis of said temperature-related variable as well as the motion of said tired wheel, said estimating means including:

provisional value calculating means for calculating a provisional value of the air pressure of said tire, on the basis of the motion of said tired wheel detected by said wheel motion sensor, such that said provisional value represents an actual value of said air pressure when said temperature-related variable detected by said temperature-related variable sensor is equal to a reference value; and provisional value compensating means for compensating said provisional value calculated by said provisional value calculating means, on the basis of said temperature-related variable and according to a predetermined relationship between said temperature-related variable and a final value of said air pressure which is said provisional value compensated by said provisional value compensating means;

wherein the air pressure of said tire is estimated on the basis of a temperature of said tire as well as the motion of said tired wheel.

2. An apparatus according to claim 1, wherein said wheel motion sensor comprises a wheel speed sensor for detecting a rotating speed of said tired wheel as the motion of said tired wheel, and said provisional value calculating means comprises a disturbance observer designed according to a dynamic model of said tired wheel in which a rim and a belt are connected to each other rotatably relative to each other by a torsion spring, said disturbance observer estimating, as a disturbance acting on said tire and as a variable indicative of a state of said dynamic model, an amount of deviation of a spring constant of said torsion spring from a nominal value, on the basis of the rotating speed of said tired wheel which is detected by said wheel speed sensor as a rotating speed of said rim, said provisional value calculating means calculating said provisional value of said air pressure of said tire on the basis of said disturbance estimated by said disturbance observer.

3. An apparatus according to claim 1, wherein said provisional value calculating means calculates said provisional value of said air pressure of said tire on the basis of a frequency of at least one of a plurality of frequency components of the motion of said tired wheel within a predetermined frequency range, said at least one of said plurality of frequency components having a substantially largest intensity.

4. An apparatus according to claim 1, wherein said provisional value compensating means determines a compensating coefficient on the basis of said temperature-related variable detected by said temperature-related variable sensor, and according to a predetermined relationship between said compensating coefficient and said temperature-related variable, said provisional value compensating means calculating said final value of said air pressure of said tire by multiplying said provisional value by said compensating coefficient.

5. An apparatus for estimating an air pressure of a tire of a tired wheel of a motor vehicle, on the basis of a motion of said tired wheel, said apparatus comprising:

a wheel motion sensor for detecting the motion of said tired wheel;

a temperature-related variable sensor for detecting a temperature-related variable related to said temperature of said tire;

estimating means for estimating the air pressure of said tire on the basis of the motion of said tired wheel detected by said wheel motion sensor;

determining means for determining whether said air pressure estimated by said estimating means is abnormal, on the basis of the estimated air pressure as compared with a predetermined threshold; and compensating means for compensating said predetermined threshold on the basis of said temperature-related variable detected by said temperature-related variable sensor;

wherein the air pressure of said tire is estimated on the basis of a temperature of said tire as well as the motion of said tired wheel.

6. An apparatus according to claim 1, wherein said temperature-related variable detected by said temperature-related variable sensor is an ambient temperature of said motor vehicle.

7. An apparatus according to claim 6, wherein said motor vehicle has an air conditioning apparatus including an ambient temperature sensor for detecting said ambient temperature to effect air conditioning in the motor vehicle, said ambient temperature sensor being utilized as said temperature-related variable sensor.

8. An apparatus according to claim 4, wherein said provisional value compensating means includes a memory in which said predetermined relationship is stored, said predetermined relationship is formulated to change said compensating coefficient in steps with said temperature-related variable.

* * * * *